US010298488B1

(12) United States Patent
Wood et al.

(10) Patent No.: US 10,298,488 B1
(45) Date of Patent: May 21, 2019

(54) PATH SELECTION AND PROGRAMMING OF MULTIPLE LABEL SWITCHED PATHS ON SELECTED PATHS OF MULTIPLE COMPUTED PATHS

(71) Applicant: Juniper Networks, Inc., Sunnyvale, CA (US)

(72) Inventors: David C. Wood, Woodbridge (GB); Jonathan C. Barth, Collegeville, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 88 days.

(21) Appl. No.: 15/282,974

(22) Filed: Sep. 30, 2016

(51) Int. Cl.
*H04L 12/703* (2013.01)
*H04L 12/751* (2013.01)
*H04L 12/723* (2013.01)
*H04L 12/773* (2013.01)

(52) U.S. Cl.
CPC .............. *H04L 45/28* (2013.01); *H04L 45/02* (2013.01); *H04L 45/50* (2013.01); *H04L 45/60* (2013.01)

(58) Field of Classification Search
CPC ......... H04L 45/28; H04L 45/02; H04L 45/50; H04L 45/60
See application file for complete search history.

(56) References Cited

U.S. PATENT DOCUMENTS

| | | | |
|---|---|---|---|
| 6,044,075 A | 3/2000 | Le Boudec et al. | |
| 6,904,017 B1* | 6/2005 | Meempat | H04L 29/06027 370/238 |
| 8,885,463 B1 | 11/2014 | Medved et al. | |
| 2002/0172149 A1* | 11/2002 | Kinoshita | H04L 45/00 370/216 |
| 2004/0218595 A1* | 11/2004 | Acharya | H04L 45/00 370/389 |
| 2005/0243723 A1* | 11/2005 | Randriamasy | H04L 45/00 370/235 |

(Continued)

FOREIGN PATENT DOCUMENTS

WO   2013184846 A1   12/2013

OTHER PUBLICATIONS

Andersson et al., "LDP Specification," RFC 3036, Network Working Group, Jan. 2001, 132 pp.

(Continued)

*Primary Examiner* — Ronald B Abelson
(74) *Attorney, Agent, or Firm* — Shumaker & Sieffert, P.A.

(57) ABSTRACT

In some examples, a network device is configured to obtain a set of N paths between a pair of nodes of a network topology model for a network of routers interconnected by a plurality of links in a network topology, where N>2, and configured to, for each label switched path from a plurality of label switched paths to be routed to the network topology: in response to identifying, from the set of N paths, a path for the label switched path that has capacity for a required bandwidth of the label switched path, deduct the required bandwidth of the label switched path from one or more links of the path of the network topology model to modify the network topology model and output data to the network for programming the label switched path in the network on the path; and in response to failing to identify a path for the label switched path from the set of N paths, add the label switched path to a set of failed label switched paths.

18 Claims, 11 Drawing Sheets

(56) References Cited

U.S. PATENT DOCUMENTS

| | | | |
|---|---|---|---|
| 2006/0209682 A1 | 9/2006 | Filsfils et al. | |
| 2007/0133420 A1 | 6/2007 | Guven et al. | |
| 2007/0133433 A1* | 6/2007 | Nam | 370/254 |
| 2008/0222282 A1* | 9/2008 | Monaghan | 709/224 |
| 2009/0285101 A1 | 11/2009 | Lu | |
| 2011/0170416 A1 | 7/2011 | Schwager et al. | |
| 2012/0281529 A1* | 11/2012 | Singamsetty | H04L 41/0896 370/230 |
| 2013/0208599 A1* | 8/2013 | Mashimo | H04L 45/125 370/238 |
| 2014/0269296 A1* | 9/2014 | Khaddam | 370/235 |
| 2015/0156106 A1 | 6/2015 | Allan | |
| 2015/0381406 A1* | 12/2015 | Francois | H04L 41/0654 370/352 |
| 2016/0191391 A1 | 6/2016 | Wood et al. | |

OTHER PUBLICATIONS

U.S. Appl. No. 15/282,942, by David C. Wood, filed Sep. 30, 2016.
U.S. Appl. No. 15/282,996, by David C. Wood, filed Sep. 30, 2016.
Office Action from U.S. Appl. No. 15/282,942, dated Feb. 20, 2018, 12 pp.
Office Action from U.S. Appl. No. 15/282,996, dated Mar. 14, 2018, 11 pp.
"NorthStar Controller Feature Guide—Release 2.0," Juniper Networks, Inc., modified Mar. 17, 2016, 142 pp.
Zhang et al., "Applicability of a Stateful Path Computation Element (PCE), draft-ietf-pce-stateful-pce-app-07," PCE Norking Group, Internet-Draft, Sep. 28, 2016, 25 pp.
Crabbe et al., "PCEP Extensions for Stateful PCE, draft-ietf-pce-stateful-pce-16," PCE Working Group, Internet-Draft, Sep. 1, 2016, 52 pp.
Vasseur et al., "Path Computation Element (PCE) Communication Protocol (PCEP)," RFC 5440, Network Working Group, Mar. 2009, 87 pp.
Extended Search Report from counterpart European Application No. 17188633.6, dated Feb. 12, 2018, 13 pp.
Response to Office Action dated Feb. 20, 2018, from U.S. Appl. No. 15/282,942, filed May 21, 2018, 14 pp.
Response filed Jun. 14, 2018 to the Office Action from U.S. Appl. No. 15/282,996, dated Mar. 14, 2018, 12 pp.
Notice of Allowance from U.S. Appl. No. 15/282,996, dated Jul. 23, 2018, 5 pp.
Notice of Allowance from U.S. Appl. No. 15/282,942, dated Jul. 20, 2018, 5 pp.
Final Office Action from U.S. Appl. No. 15/282,974, dated Jun. 22, 2018, 10 pp.

* cited by examiner

| from | to | path number | node sequence | | | | | | | |
|---|---|---|---|---|---|---|---|---|---|---|
| 1,1 | 2,1 | 1 | 1,1 | 2,1 | | | | | | |
| 1,1 | 2,1 | 2 | 1,1 | 1,0 | 2,0 | 2,1 | | | | |
| 1,1 | 2,1 | 3 | 1,1 | 1,2 | 2,2 | 2,1 | | | | |
| 1,1 | 2,1 | 4 | 1,1 | 0,1 | 0,0 | 1,0 | 2,0 | 3,0 | 3,1 | 2,1 |
| 1,1 | 2,1 | 5 | 1,1 | 0,1 | 0,2 | 0,3 | 1,3 | 2,3 | 3,3 | 3,2 | 3,1 | 2,1 |

PATH SELECTION AND PROGRAMMING OF MULTIPLE LABEL SWITCHED PATHS ON SELECTED PATHS OF MULTIPLE COMPUTED PATHS

TECHNICAL FIELD

The invention relates to computer networks and, more specifically, to path computation of computer network paths.

BACKGROUND

Routing devices within a network, often referred to as routers, maintain tables of routing information that describe available routes through the network. Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP).

The term "link" is often used to refer to the connection between two devices on a network. The link may be a physical connection such as a copper wire, a coaxial cable, any of a host of different fiber optic lines or a wireless connection. In addition, network devices may define "virtual" or "logical" links, and map the virtual links to the physical links. In other words, the use of virtual links provides a degree of abstraction. As networks grow in size and complexity, the traffic on any given link may approach a maximum bandwidth capacity for the link, thereby leading to congestion and loss.

Multi-protocol Label Switching (MPLS) is a mechanism used to engineer traffic patterns within Internet Protocol (IP) networks. Using MPLS, a source device can request a path through a network, i.e., a Label Switched Path (LSP). An LSP defines a distinct path through the network to carry packets from the source device to a destination device. A short label associated with a particular LSP is affixed to packets that travel through the network via the LSP. Routers along the path cooperatively perform MPLS operations to forward the MPLS packets along the established path. LSPs may be used for a variety of traffic engineering purposes including bandwidth management and quality of service (QoS).

Traffic engineering may be applied within a network for a variety of purposes, such as to route traffic around network failures or congested links or to direct certain traffic along a particular path through the network that meets a set of explicit requirements. Historically, MPLS label distribution was driven by protocols such as label distribution protocol (LDP), Resource Reservation Protocol with Traffic Engineering extensions (RSVP-TE) and labeled Border Gateway Protocol (LBGP). Procedures for LDP by which label switching routers (LSRs) distribute labels to support MPLS forwarding along normally routed paths are described in L. Anderson, "LDP Specification," RFC 3036, Internet Engineering Task Force (IETF), January 2001, the entire contents of which are incorporated by reference herein. RSVP-TE uses constraint information, such as bandwidth availability or shared-risk link group (SRLG) information, to compute and establish LSPs within a resource-constrained network. RSVP-TE may use bandwidth availability information accumulated by a link-state interior routing protocol, such as the Intermediate System-Intermediate System (IS-IS) protocol or the Open Shortest Path First (OSPF) protocol, extended to carry traffic engineering information.

Head-end routers of an LSP are commonly known as ingress routers, while routers at the tail-end of the LSP are commonly known as egress routers. Ingress and egress routers, as well as intermediate routers along the LSP that support MPLS, are referred to generically as label switching routers (LSRs). A set of packets to be forwarded along the LSP is referred to as a forwarding equivalence class (FEC). A plurality of FECs may exist for each LSP, but there may be only one active LSP for any given FEC. A FEC definition typically includes the IP address of the destination of the LSP, e.g., an IP address assigned to the egress router of the LSP. The ingress label edge router (LER) uses routing information, propagated from the egress LER, to determine the LSP, to assign labels for the LSP, and to affix a label to each packet of the FEC. Ingress and egress LERs may be referred to herein as "edge routers," "edge nodes," or "end nodes." The LSRs use MPLS protocols to receive MPLS label mappings from downstream LSRs and to advertise MPLS label mappings to upstream LSRs. When an LSR receives an MPLS packet from an upstream router, it switches the MPLS label according to the information in its forwarding table and forwards the packet to the appropriate downstream LSR or LER. The egress LER removes the label from the packet and forwards the packet to its destination in accordance with non-label based packet forwarding techniques.

In general, each router along the LSP maintains a context that associates a FEC with an incoming label and an outgoing label. In this manner, when an LSR receives a labeled packet, the LSR may swap the label (i.e., the incoming label) with the outgoing label by performing a lookup in the context. The LSR may then forward the packet to the next LSR or LER along the LSP. The next router along the LSP is commonly referred to as a downstream router or a next hop.

In other words, once a packet is mapped on to an LSP by an LER, the LSRs along the LSP forward the packet based on labels attached to the packet rather than making independent forwarding decisions based on the packet destination and the LSRs' routing information. A Traffic Engineering MPLS LSP (TE LSP) may in this way be used to define and implement a path from a source device to a destination device that satisfies requirements for certain traffic transported by the network.

The explicit requirements that must be satisfied by an LSP represent constraints upon the set of possible paths from the source device to the destination device. These constraints, such as available bandwidth and link attributes/coloring, direct the path computation device executing shortest path first algorithms to compute a satisfactory path for the single LSP with regard to the constraints. A shortest path algorithm may include Dijkstra, Bellman-Ford, Flood-fill, or another SPF algorithm. The network routers then establish an LSP that matches the computed path and, using the LSP, forward traffic in a manner that satisfies the constraints. The path computation device may then compute a satisfactory path for another LSP, and then another, and so on until the path computation device is unable to pack any additional LSP into the network.

Constrained shortest-path first (CSPF) thus represents a fundamental building block for traffic engineering systems, including MPLS and Generalized MPLS (GMPLS) networks. Moreover, as constraint-based path computation proceeds for multiple LSPs, when each LSP is successively loaded on the network, the available bandwidth is reduced.

As a result, constraint-based path computation in large networks may be a complex, time- and resource-consuming operation.

SUMMARY

In general, techniques are described for identifying a result set of multiple paths through a network for one or more label switched paths between a source node and a destination node. In some examples, the identified paths are computed to be broadly separate to avoid overlapping network elements. A device that routes the label switched paths to the network may select from the result set of multiple paths to route each of the label switched paths. In response to detecting a failure of a network element along the routed path for a label switched path, the device may select a new path from the result set that includes already-identified paths.

In some examples, the techniques include computing the result set of multiple paths using a recursive algorithm to identify a locally-optimal set of N paths for a cost function.

In some examples, the techniques include computing the result set of multiple paths using a heuristic algorithm to identify a locally-optimal set of N paths for the cost function.

In some examples, the techniques include selecting paths from an identified set of multiple paths to use for routing label switched paths or other traffic flows, and routing the label switched paths to the selected paths. The techniques may further include splitting a label switched path across two or more paths from the set of multiple paths.

The techniques may provide one or more advantages. For example, the multiple paths may be used to spread traffic more evenly across a network, or may be used as pre-computed alternate paths to be used in the event of a failure of one or more of the network elements. Pre-computing the alternate paths may avoid a need to compute alternate paths after detecting the failure; instead, the pre-computed paths can be used once the failure is detected.

In one example, a method comprises obtaining a set of N paths between a pair of nodes of a network topology model for a network of routers interconnected by a plurality of links in a network topology, where N>2; and for each label switched path from a plurality of label switched paths to be routed to the network topology: in response to identifying, from the set of N paths, a path for the label switched path that has capacity for a required bandwidth of the label switched path, deducting the required bandwidth of the label switched path from one or more links of the path of the network topology model to modify the network topology model and outputting data to the network for programming the label switched path in the network on the path; and in response to failing to identify a path for the label switched path from the set of N paths, adding the label switched path to a set of failed label switched paths.

In some examples, a network device comprises one or more processors coupled to a memory, wherein the one or more processors are configured to obtain a set of N paths between a pair of nodes of a network topology model for a network of routers interconnected by a plurality of links in a network topology, where N>2, and wherein the one or more processors are configured to, for each label switched path from a plurality of label switched paths to be routed to the network topology: in response to identifying, from the set of N paths, a path for the label switched path that has capacity for a required bandwidth of the label switched path, deduct the required bandwidth of the label switched path from one or more links of the path of the network topology model to modify the network topology model and output data to the network for programming the label switched path in the network on the path; and in response to failing to identify a path for the label switched path from the set of N paths, add the label switched path to a set of failed label switched paths.

In some examples, a non-transitory computer-readable medium comprises instructions for causing one or more processors to obtain a set of N paths between a pair of nodes of a network topology model for a network of routers interconnected by a plurality of links in a network topology, where N>2; and for each label switched path from a plurality of label switched paths to be routed to the network topology: in response to identifying, from the set of N paths, a path for the label switched path that has capacity for a required bandwidth of the label switched path, deduct the required bandwidth of the label switched path from one or more links of the path of the network topology model to modify the network topology model and output data to the network for programming the label switched path in the network on the path; and in response to failing to identify a path for the label switched path from the set of N paths, add the label switched path to a set of failed label switched paths.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
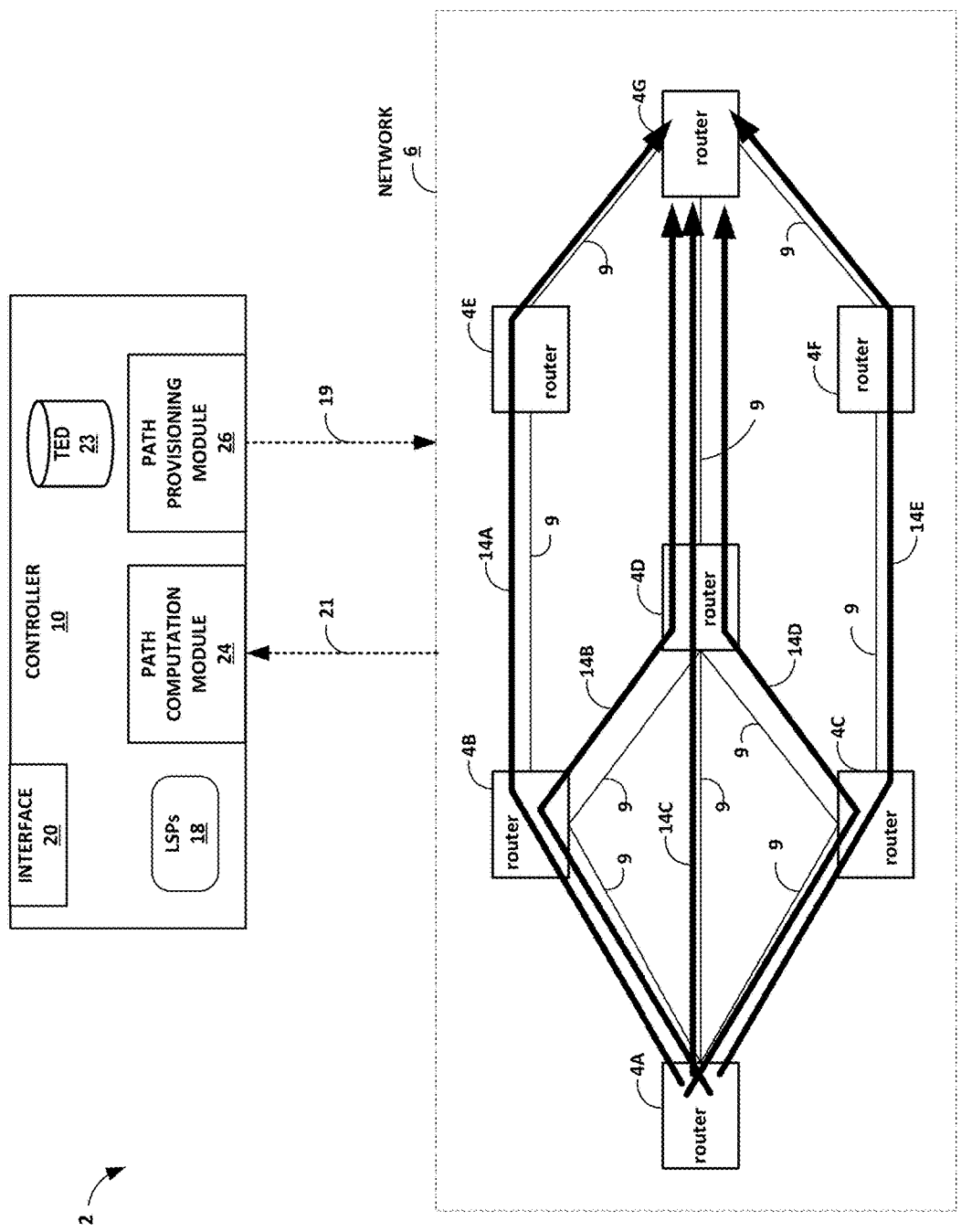
FIG. 1 is a block diagram illustrating a network system in which a path computation device is configured to compute paths for label switched paths (LSPs) in accordance with techniques of this disclosure.

FIG. 1 is a block diagram illustrating a network system in which a path computation device is configured to compute paths for label switched paths (LSPs) in accordance with techniques of this disclosure. In this example, network system 2 includes controller 10 and a Multi-Protocol Label Switching (MPLS) network 6 ("network 6") having a plurality of 4A-4F ("routers 4") interconnected in the illustrated topology by network links 9. Each pair of connected routers 4 may be connected by one or more network links 9, each network link representing at least one logical or physical link having an associated total bandwidth. Physical links of network 6 may include, for example, Ethernet PHY, Synchronous Optical Networking (SONET)/Synchronous Digital Hierarchy (SDH), Lambda, or other Layer 2 data links that include packet transport capability. Logical links of network 6 may include, for example, an Ethernet Virtual local area network (VLAN), a Multi-Protocol Label Switching (MPLS) Label Switched Path (LSP), or an MPLS traffic-engineered (TE) LSP. Various examples of network 6 may encompass many hundreds or even thousands of routers. Furthermore, although described herein as routers, routers 4 may represent other types of forwarding devices, such as switches, repeaters, optical cross-connects (OXCs), optical add-drop multiplexers (OADMs), multiplexing device, or other types of devices, within network 6 that forward network traffic, including optical data. For example, routers 4 may be layer three (L3) routers optically connected by an intermediate OXC. Accordingly, the techniques described in this disclosure may be applicable not only to packet/label switched flows but also to other flow types with different types of interface switching, such as Lambda-based and time-division multiplexing (TDM)-based.

Routers 4 are members of a path computation domain served by controller 10. The path computation domain may include, for example, an Interior Gateway Protocol (e.g., Open Shortest Path First (OSPF) or Intermediate System-to-Intermediate System (IS-IS)) area, an Autonomous System (AS), multiple ASes within a service provider network, multiple ASes that span multiple service provider networks. In various examples, different combinations of routers 4 may include member routers of multiple ASes. Network links connecting routers 4 may thus be interior links, inter-AS transport links, another type of network link, or some combination thereof. While illustrated and described with respect to routers, the techniques may be applicable to any network device that implements Multi-Protocol Label Switching (MPLS) or Generalized MPLS (GMPLS), for instance.

Controller 10 is a path computation device that uses traffic engineering information 21 learned from routers 4 of network 6 to apply constraints to compute at least one network path for and install LSPs 18 to network 6 as MPLS traffic engineering LSPs (alternatively referred to as "TE LSP"), in response to requests from any of routers 4 and/or requests for service paths received via interface 20. Controller 10 may represent a high-level controller for configuring and managing network 6. Controller 10 may represent one or more general-purpose servers; an appliance, controller, or other special-purpose device for computing paths; an application executed by a computing device; a distributed control plane of routers 4 that computes paths for LSPs managed by the routers; and so forth. In some cases, aspects of controller 10 may distributed among one or more real or virtual computing devices. Any such devices listed above may be in-network or out-of-network. Example details of a software-defined networking (SDN) controller for a software-defined network, which may perform operations described herein to compute paths and route LSPs, are described in PCT International Patent Application PCT/US2013/044378, filed Jun. 5, 2013 and entitled, "PHYSICAL PATH DETERMINATION FOR VIRTUAL NETWORK PACKET FLOWS," which is incorporated by reference herein in its entirety. Furthermore, while primarily described herein with respect to controller 10, path computation and selection techniques described herein may be performed by any one or more routers 4, e.g., by ingress routers 4 for the one or more LSPs 18.

Label-switched paths 18 ("LSPs 18") represents a data structure, such as an LSP database, that stores definitions for LSPs to be installed to network 6. Each LSP definition in LSPs defines an LSP according to source and destination routers of routers 4, as well as, in some cases, a required bandwidth for the LSP. In some examples, LSP definitions may include a defined route or path for the corresponding LSP at least in part, required or excluded link attributes, or other constraints for the corresponding LSP that may affect computation of a path for the corresponding LSP. LSPs 18 may include LSP definitions for LSPs having different pairs of source and destination routers, different bandwidth requirements, and other constraints. An LSP definition in LSPs 18 may, for example, specifies router 4A as the source, router 4G as the destination, and may specify a required bandwidth for the corresponding LSP. An administrator may set a static bandwidth for an LSP definition by configuration, or the bandwidth may be dynamic according to auto-bandwidth features of routers 4. As used herein, the term "label-switched path" may refer to an LSP definition, i.e., as a LSP to be routed in network 6 along a particular path, an installed LSP defined in part by label information configured for switching packets on the LSP, or some combination of these definitions.

Controller 10 may present northbound interface 20 that may be invoked by other controllers in a hierarchical arrangement of controllers or by an orchestrator, administrator, application, or other entity, to request service paths that resolve to an LSP definition stored to LSPs 18 and implemented in part in network 6 by LSPs 14, 16. Interface 20 may be usable for integration with an orchestration system such as OpenStack; interface 20 may also or alternatively usable by other applications or the operator's Operations Support Systems (OSS)/Business Support Systems (BSS). Interface 20 may in some cases present a RESTful Application Programming Interface (API).

Controller 10 may include a path computation element (PCE) that receives path computation requests from routers 4. A path computation request may include an LSP definition for LSPs 18, such as an ingress and egress router for an LSP to be computed, and a required bandwidth. In response to a path computation request, controller 10 may compute one or more paths and provide the one or more computed paths to the requesting device in a path computation reply. Controller 10 may execute a path computation element protocol (PCEP) to communicate path computation requests/replies with routers 4. PCEP is described further in U.S. Pat. No. 8,885,463, issued Nov. 11, 2014, which is incorporated by reference herein in its entirety.

To obtain traffic engineering information 21, controller 10 may execute one or more network routing protocols, extended to carry traffic engineering information, to listen for routing protocol advertisements that carry such traffic engineering information. Traffic engineering information may include node and interface identifiers for routers 4; administrative weights and available bandwidth per priority level for links; LSP identifier and state information for virtual links, and other information for computing paths for traffic engineered LSPs. Controller 10 may store traffic engineering information to a traffic engineering database (TED) 23.

As described in further detail below and in accordance with techniques described herein, example controller 10 includes a path computation module 24 configured to compute paths for LSPs 18 by applying bandwidth and/or other constraints to learned traffic engineering information 21. Resulting paths may be confined to a single domain or may cross several domains.

Path provisioning module 26 of controller 10 may install LSPs for LSP definitions 18 according to computed paths by sending path descriptors 19 to network 6, which configures the LSPs according to path descriptors 19. A path descriptor for an LSP includes a list of routers 4 (also referred to herein as "nodes") through which the LSP has been routed. A path descriptor may include an Explicit Route Object (ERO) for an LSP and may include information describing the corresponding path including path type (primary or detour); bandwidth for each Class of Service (CoS) value; and/or, for each node in the ordered path from ingress to egress, a node identifier, ingress label, and egress label.

The reigning paradigm for path computation is to use an external controller(s) on an MPLS network to (1) synchronize the traffic engineering database that describes a network topology (2) use the traffic engineering database to compute paths for LSPs the controller is responsible for in the network while honoring the constraints of the LSPs. In the event of a failure of a network element, the controller recalculates new paths for the LSPs across the updated topology that incorporates the failed network element while honoring the constraints of the LSPs. This paradigm means that the controller speed with which it can calculate new paths, in the event of a network or LSP failure, becomes a limiting factor in network convergence. The paradigm emphasizes local fast-reroute (FRR) within the network and/or leveraging path-protected LSPs, thus ensuring fast convergence becomes the responsibility of the distributed network.

According to techniques described in this disclosure, to route one or more LSPs for LSPs 18 that have a common pair of edge routers 4, path computation module 24 of controller 10 computes a result set of N paths (or "multiple paths"/"multi-paths") between the pair of edge routers 4 for the LSPs. In some cases, path computation module 24 computes the result set of N paths in order to spread out the traffic distribution over N>2 paths, rather than merely computing a single path or a pair of diverse paths. Path computation module 24 may further order and select from the result set of N paths to use for routing the one or more LSPs or other traffic flows. Path computation module 24 may further distribute traffic or LSP bandwidth over the N paths. The described techniques may be applied by routers 4 making independent LSP (or other traffic) path computations and selection decisions or by external controller 10 making routing and path-placement decisions for the network 6 as a whole. The multiple paths can be used to spread the traffic more evenly across the network 6 and/or may be as pre-computed alternate paths to be used in the event of a failure on one or more of the network elements of network 6 (e.g., routers 4 or links 9).

In some examples, router 4A for instance may request one or more paths for an LSP definition configured for router 4A. Using techniques described in this disclosure, controller 10 may compute the one or more paths for the LSP source and destination nodes and return the one or more paths to the router 4A. From the one or more paths, router 4A may select and install the LSP across one or more selected paths using techniques described herein, as described in detail below. In some examples, controller 10 may select the one or more selected paths using techniques described herein.

FIG. 1 illustrates a result set of N paths 14A-14E from router 4A to router 4G. For example, path 14C has ordered nodes that include routers 4A, 4D, and 4G. An LSP placed along path 14C would have ingress router 4A, intermediate or transit router 4D, and egress router 4G. In topologies in which links 9 have an equal metric, path 14C is a shortest path from router 4A to router 4G. Paths 14A, 14B, 14D, and 14E are next-shortest paths, and any one or more such paths may be used as backup path for an LSP having a primary path along path 14C. Additional paths (e.g., 4A→4C→4D→4B→4E→4G) exist in network 6, but paths 14A-14E illustrate a result set of N paths (here, N=5) from router 4A to router 4G that may be computed and identified according to techniques described in this disclosure. Controller 10 may select from among paths 14 computed by controller 10 to route one or more of LSPs 18 that proceed from router 4A to router 4G. Path provisioning module 26 of controller 10 may install routed LSPs for LSPs 18 according to the selected path(s) by sending path descriptors 19 to network 6, which configures the LSPs according to path descriptors 19.

Under this new paradigm that accords with techniques described herein, therefore, the controller 10 pre-computes multiple, N, paths for each of the LSPs 18 under its control that may be broadly separate and orders the result set of N paths by a quality metric (e.g. path metric). To install (or "load") an LSP to the network 6, controller 10 may simply and subsequently step through the ordered result set of N paths to find the first one that has sufficient capacity for an LSP. Furthermore, in the event of a failure the controller 10 may simply and subsequently step through the result set of N paths to find the first one that has sufficient capacity and has no failed network elements. If, after stepping through all the result set of N paths, controller 10 is unable to identify a suitable path in the result set of N paths, controller 10 only then attempts to re-compute a new path for the LSP. As used herein, the term "set" refers to a collection of zero or more items. The items need not be unique. A set may be implemented using a list, bag, map, dictionary, table, or other data structure. A length of size of a set refers to a number of the items in the set.

Alternatively, once controller 10 has calculated the result set of N paths, controller 10 can program the LSPs 18 that have common edge routers across multiple of the result set of N paths between the edge routers to improve both the carrying capacity and the resilience of network 6. The path computation module 24 need not be part of the controller 10 and may in some cases be a separate external component computing the multiple N paths in the background after first performing a rapid calculation to find an initial best path.

To compute and identify, up-front, the result set of N paths and to order and select from the result set of N paths to use for routing LSPs or other traffic using RSVP or SPRING (for instance), controller 10 may operate according to different conceptions of "result" as described herein. The disclosure provides definitions for the "result set of N paths" between a pair of nodes. The disclosure also describes techniques for selecting a result set of N paths from a larger set of computed potential paths, as well as techniques for determining the larger set of computed potential paths from which to select the result set of N paths. The disclosure also describes techniques for ordering/selecting from the result set of N paths to use for routing LSPs 18 or other traffic. The disclosure also describes techniques for distribute traffic/LSPs 18 across multiple paths on a network-wide scale in congested networks in order to facilitate fair traffic distribution and improve available resource utilization. Other techniques described herein include enhancements to current interior gateway protocols (IGPs) and PCEP to notify ingress routers 4 and/or the centralized controller 10 of various topological attributes to inform path computations as well as to improve the control of centralized controller 10 over how multiple paths are used by the ingress node, in terms of path ordering or bandwidth allocation, for instance.

This revised centralized controller paradigm described herein represents a departure from the current path computation and selection paradigm and may provide one or more advantages, particularly over networks with a simple or no distributed control plane. For example, pre-computing N paths from an ingress router to an egress router facilitates rapid recovery from a network element failure that affects a shortest path. Upon receiving an indication that an installed path has failed, a router 4A that has obtained multiple pre-computed paths may select another path from the pre-computed paths to install to the network 6. The number of pre-computed paths may be greater than 2, and the paths need not be diverse. As noted above, the techniques may improve a carrying capacity and resilience of the network 6 by distributing LSPs among multiple result N paths identified by controller 10. As used herein, the term path computation device may refer to controller 10 and other controller instances described in this disclosure, as well as to any of routers 4 that participate in aspects of path computation, selection, and installation for one or more LSPs.

Figure 2:
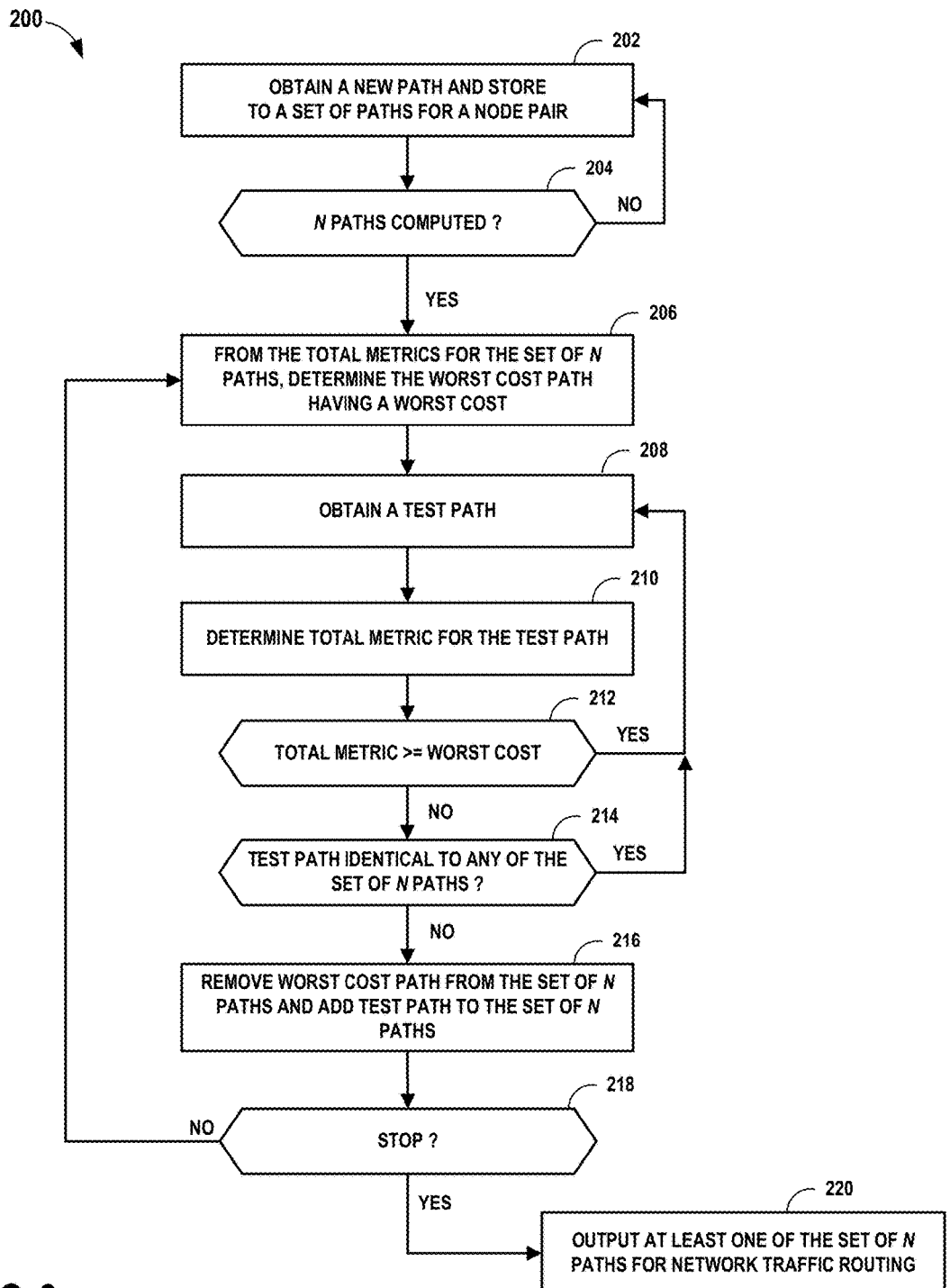
FIG. 2 is a flowchart illustrating an example mode of operation to determine a result set of N paths between two edge nodes according to techniques described in this disclosure.

FIG. 2 is a flowchart illustrating an example mode of operation to determine a result set of N paths between two edge nodes according to techniques described in this disclosure.

The conventional definition for a single "best path" between a pair of nodes is as the "shortest path," i.e., the sequence of links between the two end nodes that has the minimum total "metric," where the total metric is the sum of the (positive) metrics of the links on the path and any additional metrics for pass-through nodes. Determining a shortest path is one of the central problems in graph-theory and much of Internet routing is based on shortest path algorithms that solve this problem. Besides Dijkstra's shortest path algorithm, many other algorithms take broadly similar approaches but can be faster in certain circumstances.

Given a set of M non-identical paths between a pair of nodes computed according to an algorithm (not necessarily a shortest path algorithm), then one definition of a result set of N paths, where M>N, is the set of N paths that minimize:

$$\text{Total\_Cost} = \Sigma_{link}[(\text{Link Metric}) \times (\text{Number of paths on the link})] \quad (1)$$

The set of N paths that minimize the Total_Cost according to (1) are the shortest and thus the best N paths according to the link metric. A very simple algorithm to determine this set would be simply to determine all possible M paths and then to sort the M paths by order of lowest total metric, then to select the first N of these M paths in the order. An ordered set of paths may be defined as one or more paths ordered according to a characteristic, such as total metric or total delay. This simple algorithm requires that the set of M paths are already computed. However, if there are a very large number M of possible paths between a pair of nodes, this simple algorithm requires storing all such paths before the sorting step. This storage requirement may be prohibitive for all but very small networks. An example algorithm that may avoid storage of more than N paths plus an additional test path under evaluation and expressed using pseudo-code is as follows:

1. Fill the set of Paths with each new Path found
2. Until we have reached N-Paths in total.
    2.1. (checking to make sure no two paths are identical but not any other checks).
3. When we have reached N-Paths . . .
4. Find the path in the set with the worst total metric (worst_cost)
5. Find a new path as a potential to add to the set.
6. Check the total_metric on the new path
    6.1. If the total_metric >=worst_cost,
        6.1.1. Then discard the new path,
        6.1.2. Go back to step 3 and find another path.
    6.2. If total_metric <worst_cost,
        6.2.1. Check to make sure that the new path is not identical to any path already in the set.
        6.2.2. If the path is identical to one already there then discard it,
        6.2.3. Go back to step 3 and find another path.
    6.3. If total_metric >=worst_cost,
        6.3.1. Then insert the new path into the set and remove the previous worst path.
        6.3.2. Recalculate the new worst total metric (worst_cost)
        6.3.3. Go back to step 4 and find another path.

The above algorithm may continue until there are no new paths or until some other stopping criterion occurs. Because the formula for the best path set is linear in the number of paths on each link, the above algorithm will find the global optimum for the result set of N paths from the larger set of all M paths.

Operation 200 illustrates an example algorithm that may avoid storing more than N paths plus an additional test path under evaluation. A path computation device may execute operation 200 to determine a result set of N paths between a pair of nodes to be used for routing one or more LSPs or other traffic between the node pair. By limiting a number of paths that are stored, this technique may allow a path computation device to conserve or more efficiently use computing resources such as memory space. In some examples, by conserving memory space, this technique may allow the path computation device to identify a lower-cost solution set for the result set of N paths.

The path computation device applies a path computation algorithm to TED 23 to compute a new path for a pair of nodes and stores the new path to a set of computed paths for the node pair, so long as the new path is not identical to a path already in the set (202). The path computation device may store the set of paths to a computer-readable medium using a suitable data structure, such as a table or list. The path computation device continues computing and storing the new paths to the set of paths until N paths have been computed (YES branch of 204).

For each path in the set of N paths, the path computation device determines a total metric for the path, e.g., as the sum of the metrics of the links traversed by the path. From the respective total metrics for the N paths, the path computation device determines the worst cost path having the worst cost, e.g., the highest or otherwise most expensive total metric (206). The path computation device obtains (e.g., computes or selects from a list of paths) a test path for evaluation (208) and determines the total metric for the test path (210). If the total metric for the test path is worse than or equal to the worst cost for the worst cost path (YES branch of 212) or the test path is identical to a path already in the set of N paths (YES branch of 214), then the path computation device discards the test path and computes a new test path for evaluation (208). The determination of a test path being identical to another path may be performed first. As used herein, the term "metric" for a link may refer to, e.g., an IGP metric, a link cost, a delay, or other value associated with a link that indicates a cost of the link for switching packets using the link.

If, however, the total metric for the test path is better than the worst cost for the worst cost path (NO branch of 212) and the test path is not identical to any of the paths already in the set of N paths (NO branch of 214), then the test path is a better path than the worst cost path for the node pair, and the path computation device removes the worst cost path from the set of N paths and replaces it with the test path (216).

If the path computation device reaches a stopping criterion, such as there being no additional paths left to obtain for the node pair (YES branch of 218), the set of N paths is a result set of N paths for mode of operation 200, and the path computation device may output data describing at least one path in the result set of N paths for use in routing or programming an LSP or other traffic to the network 6 (220). For example, controller 10 may send one or more of the result set of N paths to an ingress router using respective EROs for signaling one or more LSPs in network 6. As another example, an ingress router 4 that computes the result set of N paths may output RSVP-TE messages to program one or more of the paths for one or more LSPs. If the path computation device has not reached a stopping criterion (NO branch of 218), the path computation device returns to step 206.

Because the formula for the best path set is linear in the number of paths on each link, mode of operation 200 may find the global optimum for the best N paths from the larger set of all paths computed and evaluated, where the larger set may include all possible paths if the stopping criterion is there being no further paths to compute. One or more other example stopping criteria may be used, such as a predefined time period has elapsed since beginning evaluating paths, or a predefined number of paths have been evaluated.

Figure 3:
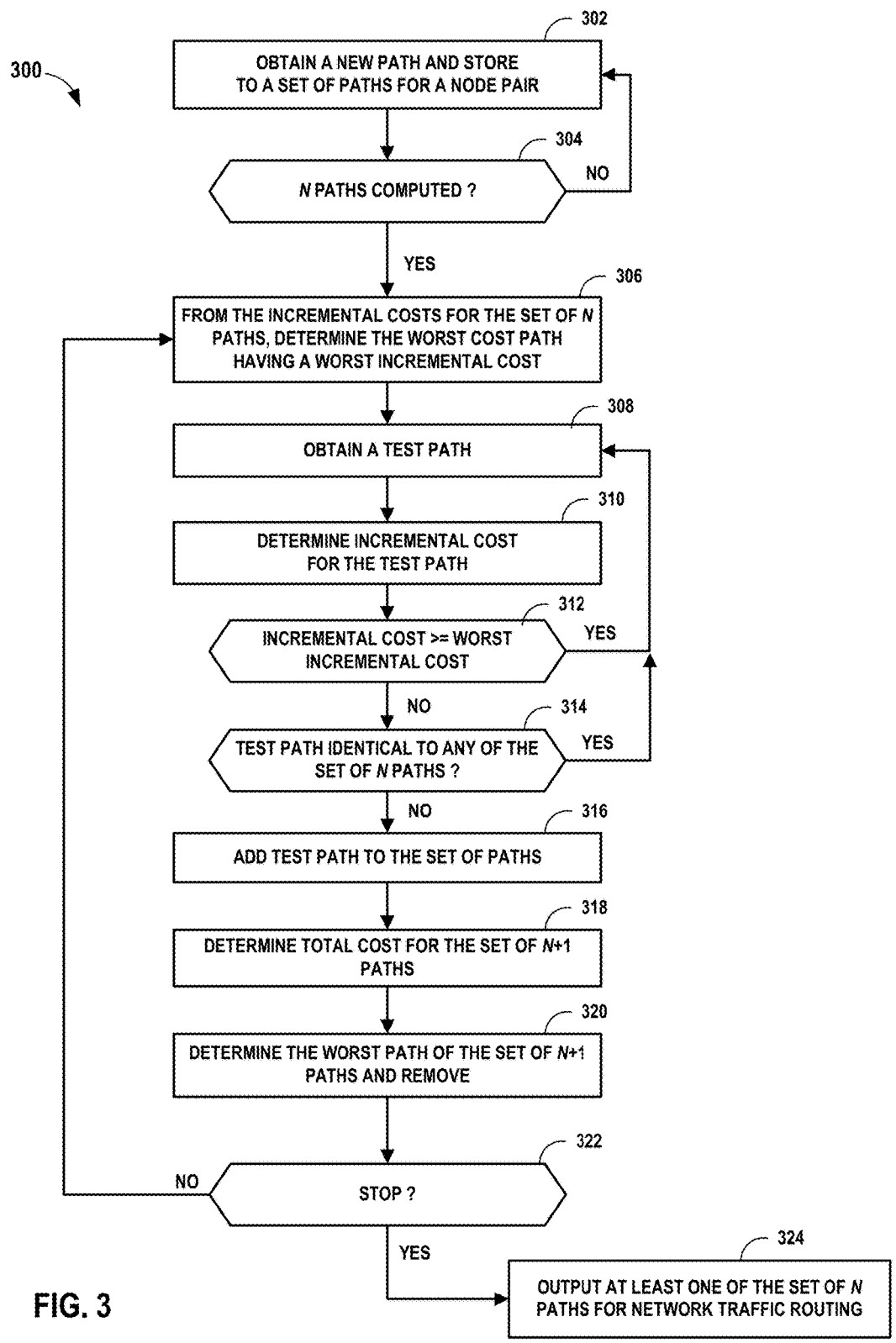
FIG. 3 is a flowchart illustrating an example mode of operation to determine a result set of N paths between two edge nodes according to techniques described in this disclosure.

FIG. 3 is a flowchart illustrating an example mode of operation to determine a result set of N paths between two edge nodes according to techniques described in this disclosure. Mode of operation 200 and other techniques described above with respect to FIG. 2 may not, in some cases, address a characteristic that a result set of N paths not only be shortest but also that such paths be intentionally distributed among distinct network elements of (e.g., links 9, nodes 4) of network 6, which may facilitate resiliency and improved network 6 carrying capacity. In general, the more "distinct" or "diverse" multiple paths are from one another with regard to overlapping network elements, the more distributed such paths are, which may facilitate the resiliency and carrying capacity if such paths are used for LSPs or otherwise routing traffic in network 6.

Accordingly, techniques are described for determining a result set of N paths that facilitates distributed paths by penalizing paths that are too similar or share common failure modes such as links, nodes, and shared-risk link groups (SRLGs). Equation (2) is a modified form of equation (1) determining a total cost of a set of N paths for a network that assigns penalties to a set of N paths when two or more of the N paths traverse a common link, node, or SRLG:

$$\text{Total\_Cost} = W_{Metric} \times \sum_{links} [M(\text{Link}) \times P(\text{Link})] + \qquad (2)$$
$$W_{Link} \sum_{links} \max\{(P(\text{Link}) - 1), 0\}^2 +$$
$$W_{Node} \times \sum_{Nodes} \max\{(P(\text{Node}) - 1), 0\}^2 +$$
$$W_{SRLG} \times \sum_{SRLGs} \max\{(P(\text{SRLG}) - 1), 0\}^2.$$

where:
$W_{Metric}$=weight assigned for link metric,
$W_{Link}$=weight assigned for overlapping paths on a link,
$W_{Node}$=weight assigned for overlapping paths on a node,
$W_{SRLG}$=weight assigned for overlapping paths on an SRLG,
M(Link)=metric on a specific link,
P(Link)=number of paths on a specific link,
P(Node)=number of paths passing through a specific node,
P(SRLG)=number of paths on a specific SRLG.

In Equation (2), if $W_{Link}$, $W_{Node}$, and $W_{SRLG}$ are all zero, then the equation reverts to Equation (1) in that the total cost is based purely on the sum of the metrics. The value of $W_{Metric}$ does not affect the result in this circumstance. If there are many paths in the network with total path cost equal to the cost of the shortest path (i.e., an equal-cost multipath (ECMP)) and these paths are fully separate (no overlapping network elements), then again the equation (2) reverts to equation (1) based on the sum of the link metrics, for in that case all links, nodes, and SRLGs in the network will all have at most one path and therefore the last three summations in equation (2) are all zero.

The relative value of the various weight factors is important when attempting to minimize a total cost of a set of N paths. Accordingly, a sensible number to choose for the $W_{Metric}$ figure is [highest working metric of the available links]$^{-1}$, that is, the highest metric for links that are not failed or at capacity. The other weights values $W_{Link}$, $W_{Node}$, and $W_{SRLG}$ may in some cases each be set to a value in [0,1] inclusive, depending on the importance ascribed to link, node, and SRLG separation, respectively. Such weight values may depend on operator policies for network 6.

In some examples, node, link, and SRLG weights may be advertised in a routing protocol message. For instance, such weights may be flooded as attributes in the TE database such that controller 10 and/or ingress router 4 may receive the weights dynamically from an advertising device. An operator may, for instance, inject a new routing protocol message into network 6, via one of routers 4 using a network management system, that includes a weight attribute specifying a weight for any of the above node, link, and SRLG weights. An interior gateway protocol (IGP) such as OSPF and IS-IS may be extended to define and distribute a new "total cost SRLG weight" attribute that specifies $W_{SRLG}$ for equation (2), where the total cost to a network for a set of N paths is based in part on $W_{SRLG}$ according to equation (2). OSPF and IS-IS may be extended in a similar manner to define and distribute "total cost link weight" and "total cost node weight" attributes that specify $W_{Link}$, $W_{Node}$ for equation (2). Controller 10 or an ingress router 4 may receive any of the above attributes and use the values for determining a set of N result paths according to techniques described herein.

In some examples, each network element (node, link, SRLG) may be associated with a specific weight. In other words, for instance, rather than a generalized weight for SRLGs, each SRLG may be associated with specific weight and different SRLGs may be associated with different weights. Equation (2) for determining a total cost for a set of computed paths may be modified to incorporate the network element-specific weights that determine a cost contribution of paths the traverse the network element to the total cost for a set of paths. For instance, and again referring to SRLGs particularly, the SRLG component of equation (2) may be modified from:

$$W_{SRLG} \times \Sigma_{SRLGs} \max\{(P(SRLG)-1),0\}^2$$

to:

$$\sum_{i=1}^{n=SRLGs} (W_{SRLG_i} \times \max\{(P(SRLG_i)-1),0\}^2).$$

In the above modified component, $W_{SRLG_i}$ may be set individually for each $SRLG_i$, or a common weight may be applied for each SLRG. Additional generalizations may be made to equation (2), as described further below.

Equation (2) usable for determining a total cost for a set of N paths and, by extension, determining an "best" or "result" set of N paths may be, in effect, a trade-off between keeping the paths in the set of N as short as possible and penalizing paths in the set that overlap on the same links, nodes, and/or SRLGs. In general, if separateness (i.e., the paths be "spread out" and not overlap, though some overlap is possible) is more important than the paths being short according to the total metric, then weights for the nodes, links, and/or SRLGs in equation (2) may be set to penalize overlapping nodes, links, and/or SRLGs to a relatively high number (e.g., 1.0). On the other hand, if shorter paths are more important than separateness or if node and/or SRLG diversity is relatively unimportant (or if SLRG information is not availability to the path computation device), then the corresponding weights in equation (2) may be set to relatively low number or zero to avoid penalizing overlap among the paths in the set. In some instances, if separateness for the set of N is highly important then the power of the dependency on the number of paths may be raised to a number higher than 2 (e.g., 4, 6, etc.). Additional generalization may be made to equation (2), as described further below. Subsequent equations relating to optimizing against the cost function represented by equation (2) will assume a power of 2, as written above, to scale the penalty for multiple paths on the same network element but such equations may be generalized, with further description of weight setting described below.

By determining a reasonably large set of different paths (if such paths are indeed available in the network), the number of actually useful or desirable paths between a pair of nodes may be much fewer than the N paths in the set and the controller or router may select, from this larger set, specific paths to use in different circumstances as described in further detail below.

The following paragraph describe an algorithm that makes use of equation (2) to determine a result set of N paths that facilitates distributed paths by penalizing paths that are too similar or share common failure modes such as links, nodes, and shared-risk link groups (SRLGs). In this case, the algorithm may determine a locally-optimal set of N paths for the general cost function represented by equation (2). This part of the algorithm does not include a detailed description of computing paths (this can be done in many ways, e.g., Dijkstra shortest-paths, recursive path calculation, etc., and is described in detail further below). Rather, the following algorithm describes determining a result set of N paths from a larger set of potential paths. Similar to the algorithms described above with respect to FIG. 2 including mode of operation 200, the algorithm below determines whether a new test path should be added to an existing set of N paths and an old path discarded (e.g., removed from the set).

When the definition of the "best" N paths was based solely on the total link metric on the path, per equation (1), the total metric for each path could be computed separately to find the worst cost for the paths. The new cost-function represented by equation (2), however, is not linear in the count of the paths on the elements, and thus the "metric" to decide whether a new path should be placed in the result set of N paths depends, at least in some respects, on the other paths and thus may not be able to be computed independently from the other paths in the set. Accordingly, while it is possible to find good methods (e.g., using simulated annealing as described below) that will steer this solution towards the "best" N paths, the globally-optimum solution may be difficult to determine.

Controller 10 may determine an incremental cost for each path in the existing set of N paths, where:

incrementCost{existingPath}=Total_
    Cost{currentPathSet+existingPath}−
    Total_Cost{currentPathSet}    (3)

The incremental cost, incrementCost, represents the increase to the total cost under equation (2) (or any of the generalizations described herein) for an existing path in the set of N paths if the existing path were to be re-added to the set of N paths. The existing path is effectively duplicated such that there are N+1 paths in the set of paths for the increment cost determination.

Then for the existing set of paths, controller 10 may determine the worst increment cost from among the set of N paths, where worstIncrementCost{CurrentPathSet}=
    worst$_{Paths\ in\ current\ set}$[incrementCost{Path}]    (4)

The worst increment cost, worstIncrementCost, is the worst increment cost from among the respective increment costs for the N paths in the current set under consideration by the algorithm, as determined by equation (3). To determine whether to add a test path (newPath) to the current set and replace an existing path, controller 10 may determine:

incrementCost{newPath}=Total_
    Cost{currentPathSet+newPath}−
    Total_Cost{currentPathSet}    (5)

If the increment cost of the test path (newPath) is less than the worst increment cost determined in equation (4), the test path is an improvement over the path in the current set of N paths having the worst increment cost, and controller 10 may replace the path in the current set of N paths with the test path.

The following is a total cost reduction algorithm that uses equations (3), (4), and (5) with recursion and path optimization to find a result set of N paths that produces a local minimum of the general cost function represented by equation (2):

1. Fill the set of Paths with each new Path found
   until we have reached N Paths in total (checking to make sure no two paths are identical but not any other checks).
2. Upon reaching N Paths:
   Calculate the incrementCost for each path in the set.
   Find the worstIncrementCost for this set
3. Find a new path as a potential to add to the set.
   Check to make sure that it isn't identical to any path already in the set.
   If the path is identical to one already there then discard it,
   go back to step 3 and find another path.
   Check the incrementCost for adding this new path to the set
   If the incrementCost >=worstIncrementCost, then discard the new path and go to step 3
   If incrementCost <worstIncrementCost,
   Then insert this new path into the set.
   Step through the (N+1) paths in the set
       find the path (P worst) that would reduce the Total_Cost by the largest amount if the path were taken out.
   Discard the (P worst) path
       Note that it is possible that the path to discard is the in fact one just added
   Recalculate the new Total_Cost and worstIncrementCost
   Go to step 3.

Continue the above steps until the (separate) algorithm to find new paths is exhausted or another stopping criteria is reached. The generalized cost-formula for the result set of N paths is non-linear in the number of paths on each network element. Hence, the above algorithm may find only a local optimum for the result N paths from the larger set of paths evaluated. However, the above algorithm is straightforward to implement and the various cost functions (equations (2), (3), and (4)) in the algorithm can be calculated by relatively fast methods, as described in further below.

If the number of useful paths between a pair of points is lower than the total number of paths in the set (N), then finding the globally-optimum set per equation (2) may not be critical to improving the operation of the network over a local optimum. The distinction between a local and a globally-optimum set of N paths may be low, so long as N is reasonably high (e.g., 16 or greater). Techniques are described below for applying this concept within a recursive path-computation algorithm to reject "poor" paths early in the recursion logic to speed up a recursive algorithm to find the paths. Techniques are also described below for an algorithm to make better approximations to find a globally-optimal set of N paths.

Mode of operation 300 is an example algorithm to determine a locally-optimal result set of N paths that may avoid storing of more than N paths plus an additional test path under evaluation. Operation 300 may obtain a locally-optimum solution for the general cost function represented by equation (2). Operation 300 may represent an example implementation of the total cost reduction algorithm described above, which uses recursion and path optimization. A path computation device may execute operation 300 to determine a result set of N paths between a pair of nodes to be used for routing one or more LSPs or other traffic between the node pair. By limiting a number of paths that are stored, this technique may allow a path computation device to conserve or more efficiently use computing resources such as memory space.

The path computation device applies a path computation algorithm to TED 23 to compute a new path for a pair of nodes and stores the new path to a set of computed paths for the node pair, so long as the new path is not identical to a path already in the set (302). The path computation device may store the set of paths to a computer-readable medium using a suitable data structure, such as a table or list. The path computation device continues computing and storing the new paths to the set of paths until N paths have been computed (YES branch of 304).

The path computation device determines a worst cost path of the set of N paths having the worst incremental cost based on the respective incremental costs for set of N paths (306). In some examples, to determine an incremental cost for a path in the set of N paths, the path computation device uses equation (3). That is, path computation device may determine the incremental cost as the difference between the total cost for the set of N paths plus the path (for a total of N+1 paths, the path being duplicated) and the total cost for the set of N paths. The total cost for the set of N paths may be computed according to the general cost function represented by equation (2). As described above, the general cost function may penalize paths that have overlapping network elements (links, nodes, SLRGs, e.g.) with other paths in the set of the paths. From the respective incremental costs for the paths, the path computation device may determine the path with the worst incremental cost (e.g., the highest incremental cost).

Path computation device obtains (e.g., computes or selects from a list of available test paths) a test path for evaluation (308) and determines the incremental cost for the test path vis-à-vis the set of N paths (310). Path computation device may use techniques described above with respect to step 306. If the incremental cost for the test path is worse than or equal to the worst incremental cost for the worst cost path (YES branch of 312) or the test path is identical to a path already in the set of N paths (YES branch of 314), then the path computation device discards the test path and obtains a new test path for evaluation (308). The determination of a test path being identical to another path may be performed first.

If, however, the incremental cost for the test path is better than the worst incremental cost for the worst cost path (NO branch of 312) and the test path is not identical to any of the paths already in the set of N paths (NO branch of 314), then the path computation device adds the test path to the set of N paths to obtain a set of N+1 paths (316). The path computation device may determine a total cost for the set of N+1 paths (318). The path computation determines the worst path from the set of N+1 paths and discards the worst path (320). To determine the worst path in some examples, the path computation device may determine which set of N paths, selected from the set of N+1 paths, has the best (e.g., lowest) total cost. The unselected path is the worst path from the set of N+1 paths.

If the path computation device reaches a stopping criterion, such as there being no additional paths left to obtain for the node pair (YES branch of 318), the set of N paths is a result set of N paths, and the path computation device may output data describing at least one path in the result set of N paths for use in routing or programming an LSP or other traffic to the network 6 (320). For example, controller 10 may send one or more of the result set of N paths to an ingress router using respective EROs for signaling one or more LSPs in network 6. As another example, an ingress router 4 that computes the result set of N paths may output RSVP-TE messages to program one of more of the paths for one or more LSPs. If the path computation device has not reached a stopping criterion (NO branch of 318), the path computation device returns to step 306.

Due to dependencies among the paths, a result set of N paths solution obtained by mode of operation may not be globally-optimal. However, in practice, a reasonably large N (e.g., 16 or 32) may provide an effectively diverse and short set of paths.

Figure 4A:
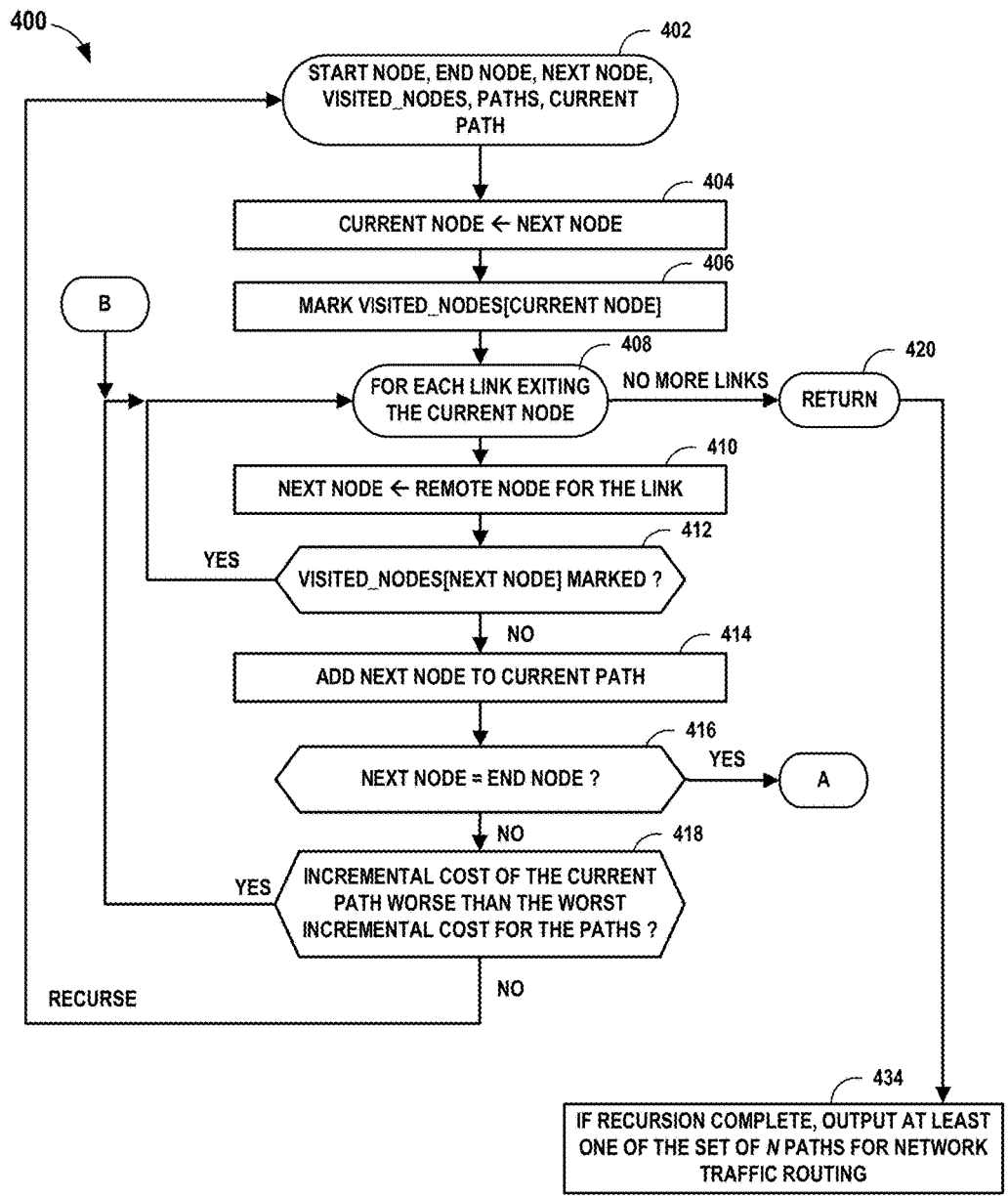
FIGS. 4A-4B depict a flowchart illustrating an example mode of operation to compute a set of multiple paths between two edge nodes according to techniques described in this disclosure.
Figure 4B:
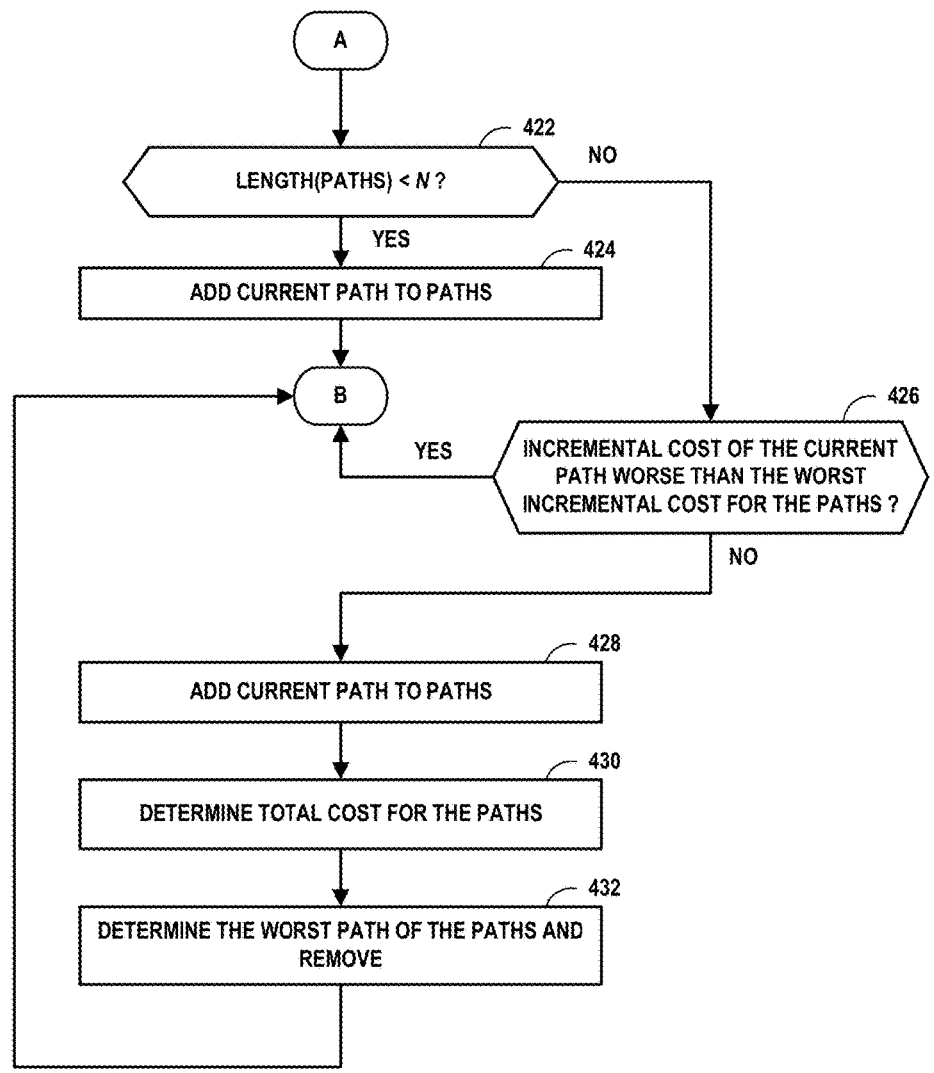

FIGS. 4A-4B depict a flowchart illustrating an example mode of operation to compute a set of multiple paths between two edge nodes according to techniques described in this disclosure. Mode operation 400 may be performed by a path computation device to obtain a result set of N paths between two nodes of a network.

In accordance with techniques described herein, an example recursive algorithm to find all paths between two nodes is as follows (using C/C++ style pseudo-code):

node_a: start or ingress node for paths
node_z: end or egress node for paths
next_node: is the current node in the recursion call stack to search for further paths to node_z
path_array: an array of paths found from node_a to node_z
path: is the new path being built up, expressed in some cases as an array of links
visited_nodes: a map of nodes where node_a plus every node that is passed through by the path being built is marked with a Boolean flag set to true. Enables early rejection in the algorithm of any path that loops back on itself, as looping paths are not usable.
recursive_find_all_paths_from_node_to_node (
node_a, node_z, next_node, visited_nodes, path_array, path)
{
    current_node=next_node
    # first mark the next node as visited to prevent loops
    visited_nodes[current_node]=true
    for (link in <array of links on current_node>) {
        next_node=<remote_node_on_link>
        # check for loops
        if(visited_nodes[next_node]==true) {
            # the next_node has already been visited so link unusable.
            # hence just skip this link
            continue
        }
        # push back the link onto the current path array as the new
        # path doesn't contain any loops
        path.push_back(link)
        # have we reached the end?
        if(next_node==node_z) {
            # end is reached—save the path into the path_array
            path_array.push_back(path)
        } else {
            # end not yet reached, call the recursive function again to
            # keep on looking, starting from the new "next_node"
            recursive_find_all_paths_from_node_to_node   (node_a, node_z, next_node, visited_nodes, path_array, path)
        # visited_nodes provided to the recursive function above may
        # be local in scope in order that multiple paths may traverse
        # the same nodes
        }
}

The above algorithm for determining a complete set of paths may be implemented in a programming language that supports recursion and has vector and map or similar constructs. The algorithm may find all non-looping paths from one node of a pair of nodes to the other node. The algorithm has a computational complexity that grows exponentially with the number of nodes in the network, the operation count being roughly proportional to {average number of neighbours−1}$^{(Number\ Of\ Nodes-2)}$.

Thus, even for relatively small networks this algorithm may become prohibitively computationally expensive. An additional problem with the above recursive algorithm is that it may find a very large number of paths between a pair of nodes, many or most of which meander around the network and are impractical. The memory requirement to store these many computed paths also grows exponentially with the network size. For the above reasons, the algorithm may become impractical to use on networks with greater than ~30 nodes.

For larger networks, in accordance with techniques described herein, an example recursive algorithm to find a locally-optimal set of multiple paths between two nodes, in the context of determining a result set of N paths, is described below. The algorithm to find a locally-optimal set of multiple paths includes modifications to the algorithm to find the complete set of paths (recursive_find_all_paths_from_node_to_node), described above, in that the algorithm to find the locally-optimal set extends the rejection criteria to reject looping paths and paths that fail to improve a set of N paths being considered during operation of the algorithm, i.e., paths that will not "make it" into the result set of N paths. The example algorithm to find the locally-optimal set is as follows (using C/C++ style pseudo-code) (additions or modifications to recursive_find_all_paths_from_node_to_node are shown in underline):

<u>recursive find locally optimal paths from node to node</u> (
node_a, node_z, next_node, visited_nodes, path_array, path) {
    current_node = next_node
    # first mark the next node as visited to prevent loops
    visited_nodes [current_node] = true
    for (link in <array of links on current_node> ) {
        next_node = <remote_node_on_link>
        # check for loops
        if (visited_nodes [next_node] == true) {
            # the next_node has already been visited so link unusable.
            # hence just skip this link
            continue
        }
        # push back the link onto the current path array as the new
        # path doesn't contain any loops
        path.push_back (link)
        # have we reached the end?
        if (next_node == node_z) {
            # end is reached (path to consider adding to path_array)
            # already N paths in our set? - if not then add this path
            <u>if (path_array.size ( ) <N) {</u>
                <u>path_array.push_back (path)</u>
                <u>continue</u>

-continued

```
    } else {
        # check whether new path will reduce the Total_cost
        # for the current set of N paths in path_array
            if (incrementalCost(path) >=
                worstIncrementalCost (path array) ) {
                    # reject the path and
                    # look for another link
                    continue
            }
            # add the new path to the set (N+1)
            path_array.push_back (path)
            # find the old_path that will most
            # reduce the total cost if removed
            old path = find worst path (path array)
            path array.remove (old path)
            continue
        }
        else {
            # end not yet reached (next_node != node_z)
            # check the set of links, nodes, SLRGs on the partial
            # path to see if partial path already exceeds the
            # worstIncrementalCost in the existing set
            if (incrementalCost (path) >=
                worstIncrementalCost (path array) {
                    # partial path already worse - reject the path
                    # and look for another link
                    continue
            }
            # Having passed all the above criteria filters, call the
            # recursive function again to continue looking, starting
            # from the new "next_node"
            recursive find locally optimal paths from node to node (
                node_a, node_z, next_node, visited_nodes, path_array,
                path)
            # visited_nodes provided to the recursive function above
            # may be local in scope in order that multiple paths may
            # traverse the same nodes
        }
    }
```

Instead of finding all the paths between a pair of nodes, the new recursive algorithm recursive_find_locally_optimal_paths_from_node_to_node finds a locally-optimal, result set of N paths between the node pair. The key effect of the modifications from the algorithm to find all paths is that the algorithm to find a locally-optimal, result set of N paths may not need to store more than N+1 paths at any point in operation, other paths found and failing to meet the various criteria of non-looping, having an incremental cost worse than the worstIncrementalCost, and if added being the most to reduce the Total_cost if removed, are discarded. In other words, recursive_find_locally_optimal_paths_from_node_to_node rejects paths that will not "make it" into the result set of N paths before calling the recursive function again, thus saving unnecessary calls.

While difficult to estimate directly the computational complexity of the modified recursion algorithm, recursive_find_locally_optimal_paths_from_node_to_node, the practical results may show a reduction in both CPU and memory utilization. Even with these improvements, however, the modified recursion algorithm may become impractical to use on networks with greater than ~40 nodes. For small networks, modified recursion algorithm may be an effective approach, for all potential paths are searched and the algorithm avoids heuristic approaches to find the multiple paths.

Mode of operation 400 is an example of a recursive algorithm with path optimization to determine a result set of N paths, according to techniques of this disclosure. Mode operation 400 may represent an example of recursive_find_locally_optimal_paths_from_node_to_node. Path computation device may apply mode of operation 400 to a representation of a network topology (e.g., TED 23).

Path computation device initializes variables start node, end node, next node, visited_nodes, paths, and current path for determining a result set of N paths. Start node and end node may represent label edge routers and may have global scope. Visited nodes is data structure having an item for each node in the network and may have local scope for a call to mode of operation 400. Paths an array of paths and may have global scope. Current path is a path being built by branching, recursive operations of mode of operation 400 and may have local scope. Path computation device invokes mode of operation 400 with the initialized variables (402).

A local current node variable is set to next node (404) and the current node is marked in visited_nodes to indicate that the current path being built has visited the current node (406). This step when tested at 412 prevents loops in the current path.

For each link exiting the router represented by the current node (408), the path computation module sets the next node to the remote node that is a destination of the link (410). If the next node is marked in visited_nodes (YES branch of 412), this recursive branch of mode of operation 400 is a leading to a path loop and the algorithm moves to the next link from the current node (408). Each iteration of loop 408 may proceed using a new instance of current path. Otherwise (NO branch of 412), path computation device adds the next node to the current path (414).

If the next node is not the end node (NO branch of 416), path computation device determines if the incremental cost of the current path is worse than the worst incremental cost for the paths (418). To make this determination, to determine an incremental cost for a path in the set of N paths, the path computation device uses equation (3). That is, path computation device may determine the incremental cost as the difference between the total cost for the set of N paths plus the path (for a total of N+1 paths, the path being duplicated) and the total cost for the set of N paths. The total cost for the set of N paths may be computed according to the general cost function represented by equation (2). As described above, the general cost function may penalize paths that have overlapping network elements (links, nodes, SLRGs, e.g.) with other paths in the set of the paths. From the respective incremental costs for the paths, the path computation device may determine the path with the worst incremental cost (e.g., the highest incremental cost).

If the incremental cost of the current path not worse than the worst incremental cost for the paths (NO branch of 418), the algorithm performs a recursive call (402). If the incremental cost is worse (YES branch of 418), the partial path is already worse than the worst path and the algorithm moves to the next link (408).

If the next node is the end node (YES branch of 416), path is a complete path. If there are fewer than N paths in paths (YES branch of 422), path computation device adds the current path to paths (424) and proceeds to the next link on the current node (408). If there are N paths in paths (NO branch of 422), path computation device determines if the incremental cost of the current path is worse than the worst incremental cost for the paths using operations similar to those described with respect to step 418 (426). If so (YES branch of 426), path computation device proceeds to the next link on the current node (408). If not (NO branch of 408), the path computation device adds the current path to the paths (428). The path computation device determines a total cost for the N+1 paths (430) and discards the worst path from paths (432). Example operations for determining the worst path of a set of paths are described with respect to FIG. 3.

If there are no links left to follow for the current node, the recursive branch returns (420). If the last remaining call to mode of operation 400 returns, the recursion is complete and paths is a result set of N paths. Path computation device may output data describing at least one path in the result set of N paths for use in routing or programming an LSP or other traffic to the network 6 (434). For example, controller 10 may send one or more of the result set of N paths to an ingress router using respective EROs for signaling one or more LSPs in network 6. As another example, an ingress router 4 that computes the result set of N paths may output RSVP-TE messages to program one of more of the paths for one or more LSPs.

Figure 5:
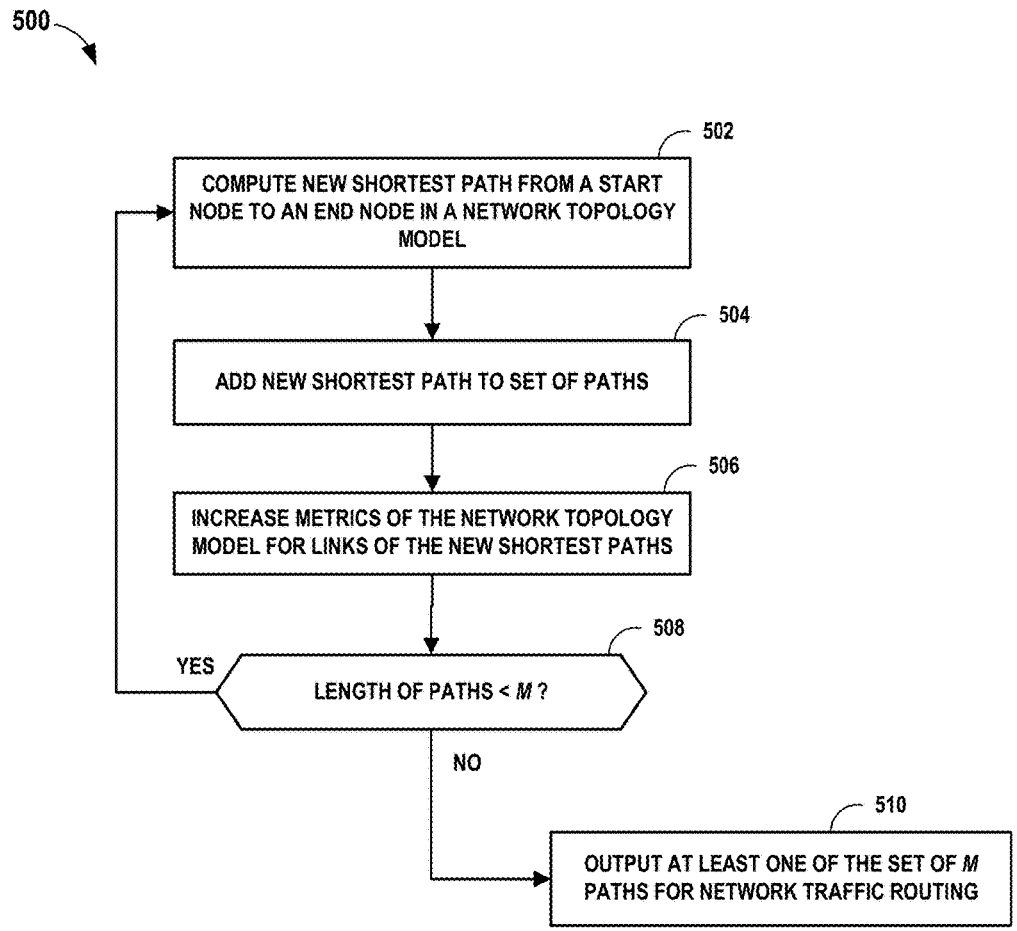
FIG. 5 is a flowchart illustrating a heuristic algorithm to determine a locally-optimal set of paths, in accordance with techniques described in this disclosure.

FIG. 5 is a flowchart illustrating a heuristic algorithm to determine a locally-optimal set of paths, in accordance with techniques described in this disclosure. The recursive algorithms described above with respect to FIGS. 3-4 grow exponentially computationally expensive with the number of nodes. For large networks the recursive approach may become impractical in some cases. Described further herein are heuristic algorithms usable for identifying many different good paths from which a locally-optimum, result set of N paths may be determined using algorithms described earlier with respect to FIGS. 1-4.

A first heuristic algorithm using metric manipulation according to techniques described herein involves heuristics with path optimization and without recursion. According to this first heuristic algorithm, path computation module 24 applies a shortest path algorithm (e.g., Dijkstra, flood-fill) repeatedly to compute the shortest path between the two nodes, but after each shortest path computation, path computation module 24 modifies link metrics for the next calculations based on the number of paths that traverse the links and thus overlap on the same links, nodes, or SRLGs on the network topology. The modifications to the link metrics may be based on the same "least-cost" definition for a multiple path set described earlier with respect to equation (2). The metric modification based on the number of paths on the links, nodes, and/or SRLGs is a temporary setting on the topology model for the purposes of computing new "shortest" paths different from earlier computed "shortest" paths. Once the set of good paths are identified the link metric penalties are removed, i.e., the topology model is reset.

Example formulae for manipulating metrics of a network topology model prior to computing shortest paths is as follows:

If $P(\text{Link}) > 0$ then workingMetric(Link)=$M(\text{Link}) + W_{link} \times (2P(\text{Link}) - 1)$ If $P(\text{Node}) > 0$ then workingMetric(Node)=$W_{Node} \times (2P(\text{Node}) - 1)$ If $P(\text{SRLG}) > 0$ then For all Links in SRLG, workingMetric(Link)=workingMetric(Link)+$W_{SRLG} \times (2P(\text{SRLG}) - 1)$ (6)

where:
$W_{Metric}$=weight assigned for link metric
$W_{Link}$=weight assigned for overlapping paths on a link
$W_{Node}$=weight assigned for overlapping paths on a node
$W_{SRLG}$=weight assigned for overlapping paths on an SRLG
M(Link)=metric on a specific link
P(Link)=number of paths on a specific link
P(Node)=number of paths passing through a specific node
P(SRLG)=number of paths on a specific SRLG
workingMetric(Link)=the metric value used in the shortest path calculation
workingMetric(Node)=additional penalty attached to paths through a node.

A node penalty (workingMetric(Node)) may be added to the working metric (workingMetric(Link)) for all links that enter the node for the shortest path calculations. In the above formulae (6), 2P(Link), 2P(Node), and 2P(SRLG) may be replaced with P(Link), P(Node), and P(SRLG), respectively, in some examples. The increase of the metrics is finite, i.e., links are not effectively pruned from the network topology and links may therefore be used in subsequent shortest paths. Thus the shortest M paths may include overlapping paths and even duplicate paths.

Mode of operation 500 is an example algorithm to determine a set of M paths from a start node to an end node in a network topology. A path computation device may execute operation 500 to determine a set of M paths from which to selects a result set of N paths between a pair of nodes to be used for routing one or more LSPs or other traffic between the node pair.

For a network topology, the path computation device computes a new shortest path from a start node to an end node in the network topology (502) and adds the new shortest path to a set of paths (504). Using formulae (6) for instance, the path computation device increases the metrics of links of the new shortest path in the network topology by a finite amount (506). If there are fewer than M paths in the set of paths (YES branch of 508), the path computation device iterates to find another new shortest path (502). Otherwise (NO branch of 508), the path computation device may output data describing at least one path in the set of M paths for use in routing or programming an LSP or other traffic to the network 6 (510). For example, controller 10 may send one or more of the M paths to an ingress router using respective EROs for signaling one or more LSPs in network 6. As another example, an ingress router 4 that computes the set of M paths may output RSVP-TE messages to program one of more of the paths for one or more LSPs.

Manipulation of the link and node pass-through metrics differs from diverse-path calculation algorithms, where links/nodes on the first path are pruned so that subsequent paths avoid the first determined paths, in that the metric manipulation algorithm applied by a path computation device only penalizes overlapping paths—it does not forbid them. Mode of operation 500 and other algorithms to find good paths using metric manipulation, as described herein, may therefore work well in many of the corner-case examples, where a simple approach of pruning the links in the main path fails.

Note that the focus of this heuristic approach is to identify many (e.g., more than two) paths that are "spread out" as much as is practical, rather than just finding two diverse paths. The heuristic algorithm also introduces the concept of SRLG diversity to identify multiple paths spread across the SRLGs. If network 6 has several paths that have the same total metric as the shortest path (ECMP), which are diverse to each other, then metric manipulation may mean that successive applications of the shortest path algorithm can still find all such paths. In some cases, there may be more than two diverse paths. In example networks tested so far the algorithm is able to find all ECMP shortest paths that exist in the example networks.

Note that the metric manipulation algorithm simply changes the basis of what is defined as the shortest path. A new path found after changing the metrics may be the same as another one already identified. However, each new path identified that identical to one before steadily increases the metric penalty for overlapping the links, nodes, and/or SRLGs on this path. Eventually, if they exist, path computation module 24 will identify new paths that are not the same as earlier ones based on the modified network topology.

The presence of possible duplicate paths in this set is one of the differences between simply finding a set of "good-paths" discussed here and the techniques described earlier with respect to FIGS. 3-4 to find the locally-optimal result set of N paths. The "good" paths found by this heuristic may be passed into the total cost reduction algorithm described above with respect to FIG. 3, to remove any duplicate entries and find a locally optimal result set of N paths. Because the heuristic metric manipulation algorithm above may find some duplicate paths, it may be necessary in some cases to perform greater than N iterations of the shortest path computation and metric manipulation cycle in order to identify N different paths. Further in some examples, to find a locally-optimum result set of N paths then greater than M "good" paths may be identified in order to pass to the total cost reduction algorithm for optimization.

In tests, (2*N+4) iterations of the shortest path computation and metric manipulation cycle is typically sufficient to identify M different paths with properties of separateness. Other examples may apply more or fewer iterations for determining a result set of N paths from the set of M paths. The computational complexity for these tests may add one or more N iterations to the calculation, but the complexity is polynomial-time rather than the exponential complexity of the pure recursion algorithms described above with respect to FIGS. 2-3 and thus the first heuristic algorithm may be practically applied to large networks.

Other sets of paths that are useful for routing LSPs include: (1) new protection paths that need to be found when a node, link, or shared risk fails on the shortest path, and (2) new protection paths that need to be found when there is a double-failure of a node, link, or shared risk on the shortest path as well as a node, link, or shared risk on the protection paths. Accordingly, the first heuristics algorithm described above may be used by path computation module 24 to identify good multiple paths by exhaustively simulating single and double failures on the shortest path found. Not all such failure modes will result in a path that survives this failure. However, if path computation module 24 is able to identify a new path, the new path may be checked to see whether it duplicates one in the existing set. From there, the total cost reduction algorithm may be applied to determine whether the new path should be included in a result set of N paths.

The algorithms described above may be combined to find yet more paths if needed, for example, by:
  Performing exhaustive failure simulation
    Then manipulating the metrics for subsequent path computation, as described above.
  Stepping through the intermediate nodes in the network and combining partial paths from one end and to the other end to make a composite path.
    (Either under normal conditions or combined with exhaustive failure simulations on the main paths.)

Such approaches may test to ensure that the combined paths do not result in loops of any kind and are whole, the total cost reduction algorithm may be applied to combined paths that satisfy these criteria to determine whether the new paths should be included in a result set of N paths. Note that if path computation module 24 identifies a path based on composite sections of shortest paths from/to the two end nodes via an intermediate node, then path computation module 24 may check the path for loops before applying the total cost reduction algorithm to determine whether the path should be included in a result set of N paths.

Single and double failure calculations only need to be done in the nodes, links, and/or SRLGs in the shortest and the protection paths. It is not necessary to fail every element in the topology model for network 6. This exhaustive failure calculation works in polynomial time, with some multiple of N calls to the shortest path algorithm typically being satisfactory for identifying a result set of N paths.

While the heuristics approach may not necessarily find N different paths in operation (if such paths exist), in the experiments done in example networks, the heuristics approach is able to identify a satisfactory number of "sensible" paths between the two nodes and produces a sufficient number of paths to use for traffic distribution and placement.

In some examples, path computation module 24 may apply the heuristic algorithm to find N good paths for path_array to effectively prime the recursive algorithm described above, recursive_find_locally_optimal_paths_from_node_to_node, to find a wider set of paths from which to choose a result set of N paths. This combined approach of heuristics, path optimization, and recursion may speed up the recursive algorithm, for if the set of paths (e.g., path_array) is already "good" before the recursive algorithm is invoked, then more paths will be rejected earlier in the recursion. Accordingly, the call stack size and CPU utilization may be reduced. However, the combined approach does not prevent the complexity of the recursion growing exponentially with the network size and may be impractical to use for large networks. For smaller networks at least, the combined heuristic and recursion algorithm provides a way to directly compare the results of the heuristics approach with the recursive method.

Figures 6, 7:
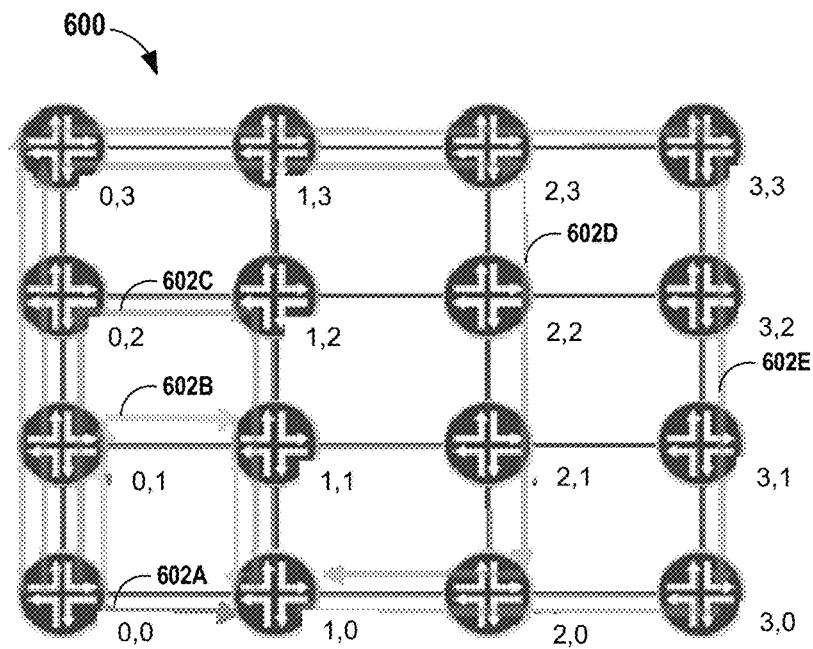
FIG. 6 is a block diagram illustrating a network of nodes and a set of paths between a pair of nodes computed according to techniques described in this disclosure.
FIG. 7 is a table with rows that each describe a different path for a network between a pair of nodes, computed according to techniques described in this disclosure.

FIG. 6 is a block diagram illustrating a network of nodes and a set of paths between a pair of nodes computed according to techniques described in this disclosure. The example network 600 is a network arranged as a 4×4 square topology, with nodes on the square vertices and vertical/horizontal links between neighboring nodes. Hence most nodes in network 600 have 4 neighbors though the edge and corner nodes have 3 and 2 neighbors, respectively. Between node 0,0 and node 1,0 there are two diverse paths and four other paths that best minimize the overlap between the paths.

The computed paths 602A-602E are example paths computed using the heuristic algorithm to determine a locally-optimal set of paths described with respect to FIG. 5. Computed paths 602A, 602B include the two best diverse paths and computed paths 602C, 602D, and 602E include three of the four other paths that best minimize the overlap between the paths.

Accordingly, although the heuristic algorithm may not find all the possible paths and hence in some cases find fewer than N=16 paths, the heuristic algorithm does find the "good" paths, including all the possible diverse paths.

FIG. 7 is a table with rows that each describe a different path for a network 600 between a pair of nodes, computed according to techniques described in this disclosure. Path computation module 24 may apply heuristic algorithm to determine a locally-optimal set of paths described with respect to FIG. 5 to compute the paths between node 0,0 and 1,0 described in the respective rows of table 700. For example, path number 3 is 0,0→0,1→0,2→1,2→1,1→1,0 (this is illustrated as path 602C in FIG. 6).

Figures 8, 9:
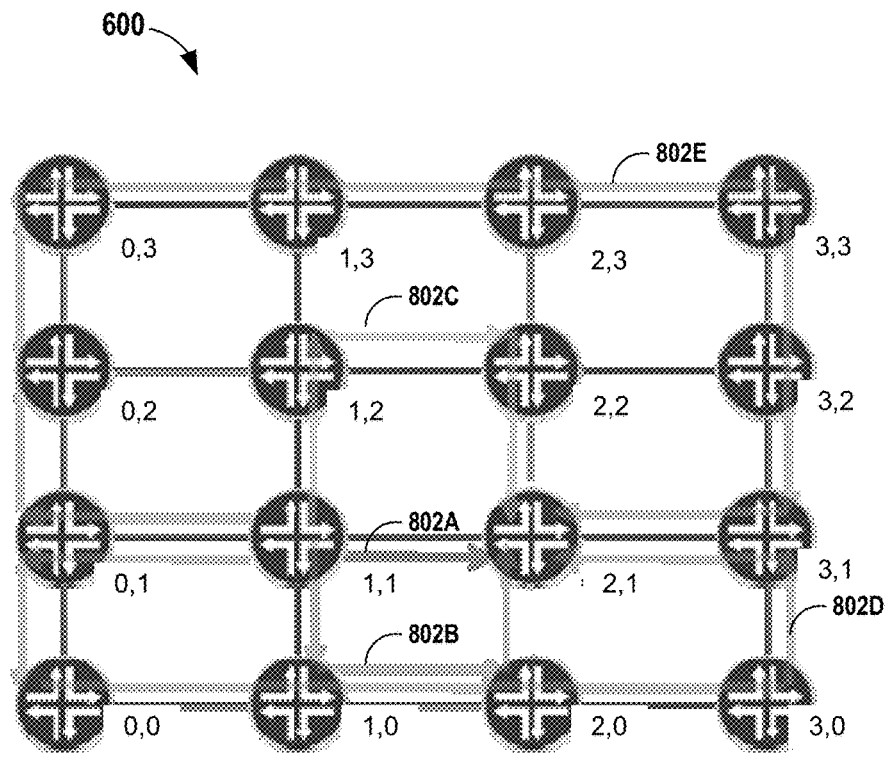
FIG. 8 is a block diagram illustrating a network of nodes and a set of paths between a pair of nodes computed according to techniques described in this disclosure.
FIG. 9 is a table with rows that each describe a different path for a network between a pair of nodes, computed according to techniques described in this disclosure.

FIG. 8 is a block diagram illustrating a network of nodes and a set of paths between a pair of nodes computed according to techniques described in this disclosure. Between node 1,1 and node 2,1 there are three diverse paths. Path computation module 24 may apply heuristic algorithm to determine a locally-optimal set of paths described with respect to FIG. 5 to compute the paths between node 0,0 and 1,0 described in the respective rows of table 700. The computed paths 802A-802E are an example of paths computed using the heuristic algorithm. Computed paths 802A, 802B, and 802C are the three diverse paths identified by the heuristic algorithm, and computed paths 802D and 802E are two additional paths that minimize overlap with the three diverse paths.

FIG. 9 is a table with rows that each describe a different path for a network 600 between a pair of nodes, computed according to techniques described in this disclosure. Path computation module 24 may apply heuristic algorithm to determine a locally-optimal set of paths described with respect to FIG. 5 to compute the paths between node 1,1 and 1,2 described in the respective rows of table 900. Path numbers 1-5 correspond to computed paths 802A-802E of FIG. 8, respectively.

Between the two corner nodes of network 600 (i.e., node 0,0 and node 3,3) there are strictly only two diverse paths as all paths must use the corner links. However, the heuristic algorithm finds the two diverse paths as well as the identical result set of N=16 paths identified by the full recursive algorithm. For a larger network examples, the differences between the heuristic algorithm and full recursion is much less, though it is impractical to do the recursive calculations above around a 7×7 square network. Typically, the overall cost function for the heuristic approach is only 1-2% worse for a given node pair than is the overall cost function for a solution obtained by the full recursive algorithm.

The various algorithmic techniques for finding a result set of N paths described herein may produce different timing results. The techniques were tested using square networks, similar to network 600, of different sizes from 4×4 to 10×10, though not all of the techniques were able to scale to larger network sizes. The details of each of these algorithms are described above. Timing data provided below is a result of running the algorithms with a single-threading laptop computer.

Pure Recursion
    Worked fine up to 5×5 square network (~30 secs for all paths)
    6×6 square impossible.
        3G of memory needed after 1.5% of the paths calculated
Recursion+path optimization (result N=16-paths)
    Worked fine up to 6×6 square network (~100 secs for all paths)
    7×7 square possible (estimate 2,500 secs)
    >7×7 square not practical
Recursion+path Optimization (result N=16-paths)+Heuristics
    Worked fine up to 6×6 square network (~70 secs for all paths)
    7×7 square possible (estimate 1,500 secs)
    >7×7 square not practical
Heuristics only+path Optimization (best 16-paths)
    Works fine up to 10×10 square network and beyond (~60 secs for all paths)
    Polynomial time complexity ~3×[NumberOfPaths]×[ShortestPath computation time]

A small number of path-pairs found fewer than the target set of 16 paths
    However, all "good" paths found
    Overall cost metric was within 1% of the results for the recursive calculations.

The heuristics scale in polynomial time and are almost as effective as the recursive algorithms in terms of optimizing the set of paths.

TABLE 1

Timing comparisons between different algorithm results

| Algorithm | Square Sides | Node Count | Recursion Count | Average Paths per node-pair | CPU time (s) | Notes |
|---|---|---|---|---|---|---|
| Recursion | 4 × 4 | 16 | 71,564 | 119 | 0.12 | |
| Recursion | 5 × 5 | 25 | 11,031,944 | 5101 | 29.35 | |
| Recursion | 6 × 6 | 36 | N/A | N/A | 22,000 (estimate) | 312 s for 1.42% of paths. However, memory was growing continually and at 1.42% was over 3 GB |
| Recursion + path optimization | 4 × 4 | 16 | 35,509 | 16 | 0.11 | |
| Recursion + path optimization | 5 × 5 | 25 | 916,305 | 16 | 3.0 | |
| Recursion + path optimization | 6 × 6 | 36 | 27,419,995 | 16 | 103.16 | |
| Recursion + path optimization | 7 × 7 | 49 | N/A | 16 | 2,500 (estimate) | 601s for 23.7% of paths. No memory issues |
| Recursion + path optimization+ heuristics | 4 × 4 | 16 | 28,799 | 16 | 0.11 | |
| Recursion + path optimization + heuristics | 5 × 5 | 25 | 601,306 | 16 | 2.0 | |
| Recursion + path optimization + heuristics | 6 × 6 | 36 | 19,048,973 | 16 | 68.38 | |

TABLE 1-continued

Timing comparisons between different algorithm results

| Algorithm | Square Sides | Node Count | Recursion Count | Average Paths per node-pair | CPU time (s) | Notes |
|---|---|---|---|---|---|---|
| Recursion + path optimization + heuristics | 7 × 7 | 49 | N/A | 16 | 1550 (estimate) | 6005 for 38.69% of paths. No memory issues |
| Heuristics only | 4 × 4 | 16 | N/A | 9.23 | 0.03 | |
| Heuristics only | 5 × 5 | 25 | N/A | 12.44 | 0.17 | |
| Heuristics only | 6 × 6 | 36 | N/A | 13.99 | 0.74 | |
| Heuristics only | 7 × 7 | 49 | N/A | 14.7 | 2.68 | |
| Heuristics only | 8 × 8 | 64 | N/A | 15.07 | 8.52 | |
| Heuristics only | 9 × 9 | 81 | N/A | 15.28 | 24.12 | |
| Heuristics only | 10 × 10 | 100 | N/A | 15.43 | 60.63 | |

Figure 10:
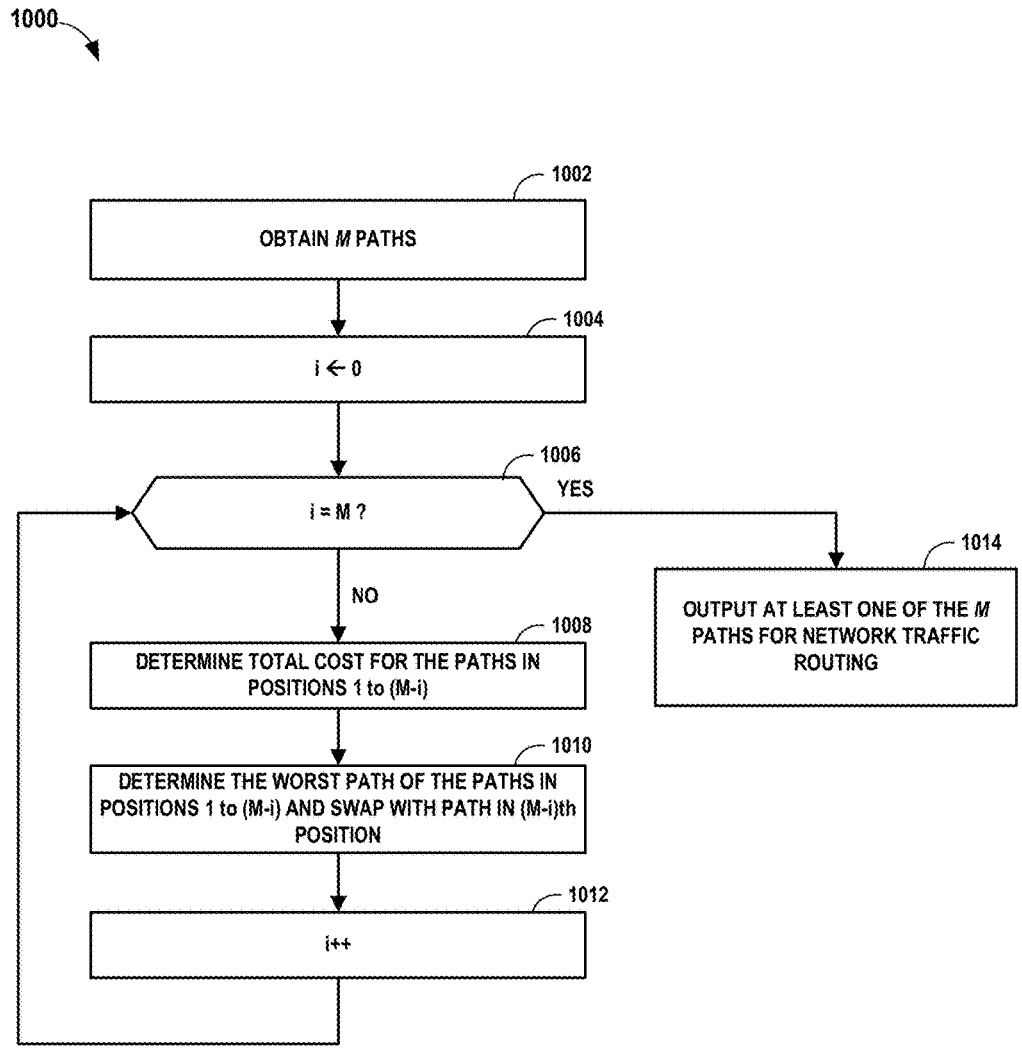
FIG. 10 is a flowchart illustrating an example mode of operation for ordering and selecting one or more paths from a result set of N paths, according to techniques described herein.

FIG. 10 is a flowchart illustrating an example mode of operation for ordering and selecting one or more paths from a result set of N paths, according to techniques described herein.

Once a result set of N paths is computed, controller 10 may apply a separate filter or sorting to determine how they may be used to route a specific LSP. Several potential approaches that can be used are described below. For each specific set of LSPs between an ingress and egress pair, the controller 10 may use different approaches to decide which one or more paths of a result set of N paths are used, and the order in which paths are selected in the event of a failure or congestion on a previously chosen path.

In one approach, controller 10 may sort the N paths in ascending order of total link metric, then select from the ordered paths in turn to find the first path with sufficient capacity and no failed elements. If there are multiple paths with overall metrics equal to the lowest cost path (ECMP) then, in some cases, the LSP bandwidth may be distributed across the multiple paths in proportion to the bandwidth available on each path.

In another approach, controller 10 may sort the N paths in ascending order of total delay, then select from the ordered paths in turn to find the first path with sufficient capacity and no failed elements. If there are multiple paths with overall delays equal to the lowest delay (ECMP) then, in some cases, the LSP bandwidth can be distributed across the multiple paths in proportion to the bandwidth available on each path.

In another approach, controller 10 may sort the N paths in order by each path's contribution to the overall cost function (e.g., as expressed by equation (2)). This approach may ensure that the first few paths are a compromise between selecting the "shortest" path and ensuring that the paths are reasonably diverse. An example overall cost sorting algorithm may be executed by controller 10 and is as follows:
Find the path that leads to the highest reduction in the overall cost-function if it is removed.
  Label this path as the N-th path in the sorted list
For the remaining paths find the one that leads to the highest reduction of the overall cost-function if removed.
  Label this path as the (N−1) th path in the sorted list.
Continue processing the M-paths in the remaining list, removing the one that leads to the highest reduction in the overall cost function.
  Label each path as the Mth path in the sorted list.
  Continue this until there are no paths left to process.
In mode of operation 1000, path computation device obtains M paths (1002) and sorts them according to the overall cost function represented by equation (2). Path computation device sets an iterator, i, to 0 (1004). For each of M positions in an ordering for the M paths, path computation device determines the total cost for the paths in the remaining positions 1 to (M−i) (1008), determines the worst path of the paths in the remaining positions 1 to (M−i) and moves the worst path to the (M−i)th position (1010). To determine the worst path in some examples, the path computation device may determine which set of M−i−1 paths, selected from the set of M−i paths, has the best (e.g., lowest) total cost. The unselected path is the worst path from the set of M−i paths. The path computation device increments the iterator (1012) and continues through the loop until the M paths are ordered or labeled in order by the general cost function. Path computation device may output data describing at least one path in the set of M paths for use in routing or programming an LSP or other traffic to the network 6 (1014). For example, controller 10 may send one or more of the M paths to an ingress router using respective EROs for signaling one or more LSPs in network 6. As another example, an ingress router 4 that computes the M paths may output RSVP-TE messages to program one of more of the M paths for one or more LSPs.

In another approach, a "best-diverse" pair of paths may be required, e.g., as for routing a primary LSP and a corresponding backup LSP. A best-diverse pair of paths need not be strictly diverse (i.e., no overlapping network elements) and may have some overlap, which may be determined as a weighted combination of a number of link, number of elements, and number of SRLGs shared by the pair of paths. An example algorithm for finding a "best-diverse" pair may be executed by controller 10 and is as follows:
  Step through all possible pairs of paths in the result set of N paths with sufficient capacity to carry the LSP
  Compute an overlap for the path-pair
  Find the minimum path overlap (min_overlap) from among the respective overlaps of the path-pairs
  For all the path-pairs with overlap=min_overlap, determine the path-pair with either:
    Minimum total link metric
    Minimum total delay
A similar exhaustive approach may be applied to find diverse paths between different node pairs. For paths between different node-pairs there are $N^2$ possible pairs (rather than ×(N−1)/2), but otherwise the algorithm is similar to the above algorithm for finding a "best-diverse" pair.

To find multi-diverse path sets from the result set of N paths (i.e., more than 2 best-diverse paths), the number of combinations grows exponentially with the number of paths (e.g., N×(N−1)×(N−2)/6 for 3-paths etc.). But otherwise, the algorithm for finding multi-diverse path sets is similar to the above algorithm for finding a "best-diverse" pair. However, while this may be efficient for 3-paths, an optimization technique may be used to select a larger number of diverse paths from the result set of N paths.

To find multi-diverse path sets between different nodes, a similar approach may be used, though number of number of possible paths to search from is different in such cases. An optimization technique may be used to determine best-diverse sets that cover paths between more than two nodes.

Because the path computation and selection algorithms above apply to the underlying network topology, rather than the current state of the network after installing individual LSPs to the network, the algorithms operate independent of the current state of the network and each path-pair computation may be made from the same common database of the network topology. As a result, the path computation and selection algorithms described above with respect to FIGS. 1-10 can execute in parallel in a multi-core, multi-processor system.

In some examples, a controller that includes a multiprocessor or otherwise a multicore environment executes a separate worker thread for each core, and the threads share the same data model of the network topology (e.g., TED 23). Each worker thread may process path computation and selection for a different pair of nodes for which paths are needed to use for routing one or more LSPs or flows. An example approach for such parallel processing is as follows:

Determine one or more node pairs for LSPs to be routed and enqueue.
Thread identifies a node pair that has not been processed.
  Acquire mutex lock on the node pair to prevent access by other threads
  Compute the result set of N paths for this node pair
  Sets the flag on the node pair to indicate it has been processed
  Remove node pair the processing queue and release the mutex lock.
Return to identify a node pair until all pairs are processed.

This approach may achieve an almost linear speed-up of the elapsed computational time with the number of processor cores used. If the external controller 10 is a large server with many cores, the elapsed time to find 16- or 32-paths between each node pair can be comparable to that needed for a simple single-threaded CSPF algorithm to find a single path, given that CSPF algorithms are applied sequentially and are little improved by multi-threading.

Figure 11:
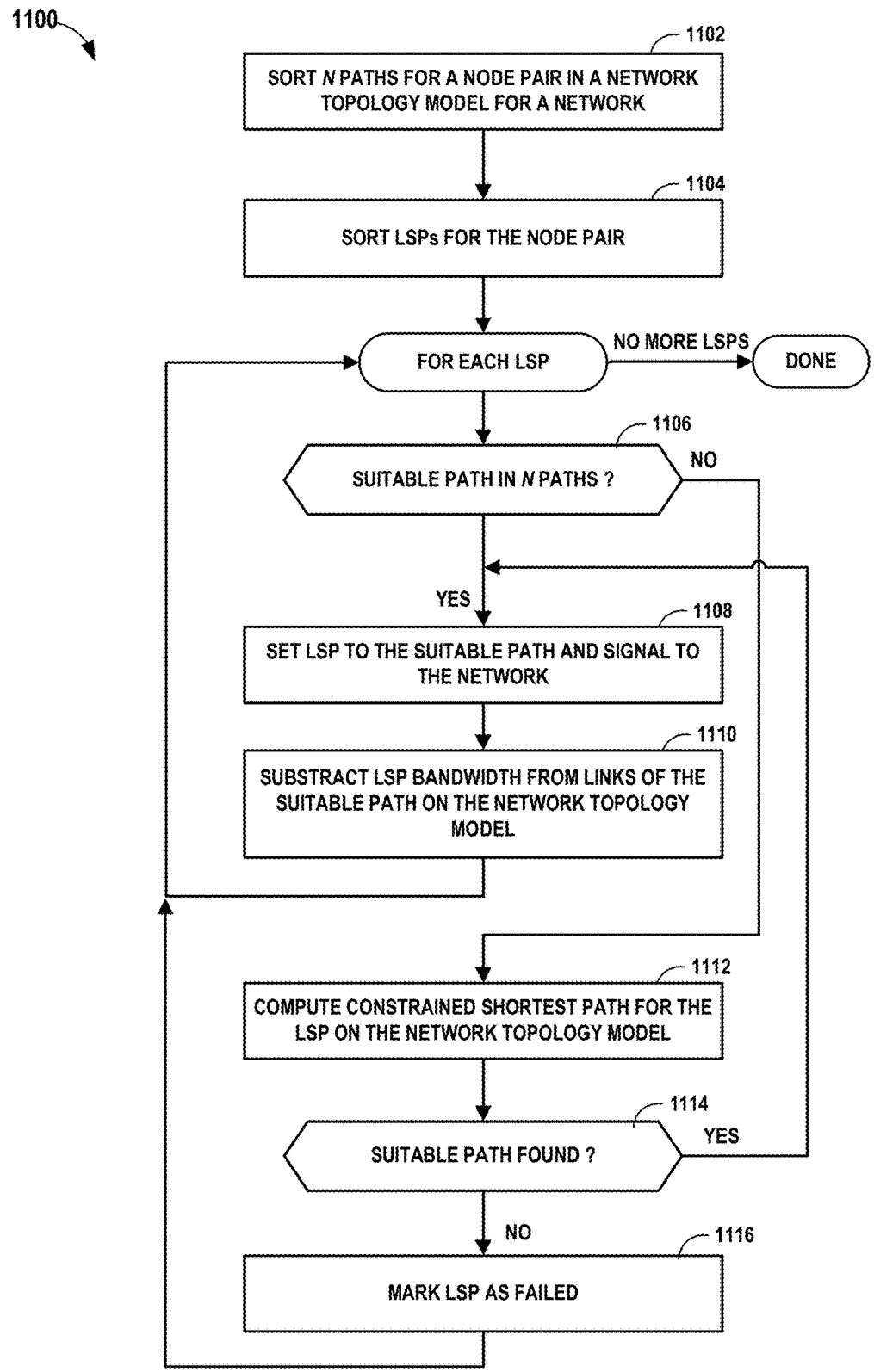
FIG. 11 is a flowchart illustrating an example mode of operation for routing label switched paths to a network using a set of N paths, according to techniques described in this disclosure.

FIG. 11 is a flowchart illustrating an example mode of operation for routing label switched paths to a network using a set of N paths, according to techniques described in this disclosure. Multiple approaches are described below for programming LSPs onto ingress label edge routers (LERs); these approaches may be applicable in various circumstances. The set of N paths may be set of paths determined using any of the algorithms or combinations of algorithms described in this disclosure.

One approach for using a result set of N paths for programming one or more LSPs to a network is as follows:
Sort the result set of N paths between a pair of nodes where there are one or more LSPs to route between the node pair.
  Sort result set of N paths by the lowest metric, lowest-delay, or other appropriate sorting formula required by the LSPs.
Sort the LSPs, for instance:
  By highest priority then in descending order of LSP bandwidth
  By highest priority then in ascending order of LSP bandwidth
  By highest priority, then randomly distributed for each priority
  Alternatively to sorting: process the LSPs in the order presented to the controller
Program the sorted LSPs sequentially onto the network.
  For each LSP in the list:
    Using the first path in order of the appropriate sorted list of the result set of N paths that has (1) has no failed components and (2) sufficient bandwidth capacity to carry the LSP traffic (e.g., meet the LSP bandwidth requirement).
    If no paths in the result set of N paths satisfy (1) and (2), then put the LSP into a list of failed LSPs.
    If a suitable path is found, then
      Subtract the LSP bandwidth from the available bandwidth on the links on the suitable path.
      Associate the path with the LSP and signal to the network for programming the LSP to the path.
  For each failed LSP in the list of failed LSPs
    Perform last-resort direct CSPF computation for attempt to identify a suitable path that has (1) has no failed components and (2) sufficient bandwidth capacity to carry the LSP traffic.
    If a suitable path is found, then:
      Subtract the LSP bandwidth from the available bandwidth on the links on the path.
      Associate the path with the LSP and signal to the network for programming the LSP to the path.
    If no suitable path is found, then fail the LSP.

If an LSP requires diverse paths (or is part of a diverse-path pair), the path computation device may use the diverse path algorithm described above to find the best diverse-pair of paths with available capacity rather than merely iterating through the sorted list of paths.

Unlike a direct CSPF approach, the failure paths are pre-computed for the set of LSPs to route in order that the CSPF algorithm is only called on a per-LSP basis as a last resort and only after programming all LSPs that can be routed in this way using the result set of N paths. Again, although the CPU utilization and time to find the result set of N paths is greater than that needed to find an individual path. The failure paths are pre-calculated by a controller or router and can be applied by a controller or router very quickly, and the approach described herein performs a separate CSPF operation for a single LSP only as a last resort.

Mode of operation 1100 is an example algorithm for routing a plurality of LSPs that have a common source router and destination router to a set of N paths from the source router to the destination router. While the device that computes the paths may not necessarily be the device that routes the LSPs to the paths, operation 1100 is described with respect to a path computation device for purposes of example. For example, an ingress router for the plurality of LSPs may receive the N paths from an external controller (e.g., controller 10) and route the LSPs to the N paths using operation 1100.

The path computation device sorts N paths, the N paths being for a node pair in a topology model for a network (e.g., TED 23) (1102). The path computation device may use operation 1000 to sort the N paths, sort the paths by metric, sort the paths by delay, etc. The path computation device may also sort the LSPs for the node pair (1104). The path computation device may sort the LSPs by priority, then in descending or ascending order of required bandwidth. In other examples, the path computation device may randomize the LSPs by priority, or route the LSPs unsorted.

For each LSP, the path computation device attempts to find a suitable path in the N paths that has no failed elements (i.e., is live) and has sufficient capacity for the LSP bandwidth. If a suitable path exists (YES branch of 1106), the path computation device routes the LSP to the suitable path and signals the association of the LSP to the suitable path to the network (1108). For example, a controller may output an ERO describing the path for the LSP to the LSP ingress router, and/or the ingress router may signal the LSP using RSVP along the suitable path. The path computation device also subtracts, the network topology model, the required bandwidth for the LSP from the available bandwidth of each link of the suitable path to reflect the routed LSP (1110).

If no suitable path is found from the N paths (NO branch of 1106), the path computation device attempts to compute a constrained shortest path (e.g., using CSPF) on the current network topology model for the LSP having a required bandwidth constraint (1112). If no suitable path is found (NO branch of 1114), the path computation device marks the LSP as failed and does not route the LSP (1116). If a suitable path is found, the path computation device performs steps 1108 and 1110 for the LSP and the suitable path.

In some cases, if, after sorting the paths, there is more than one live path having total metric equal to the best metric, then the controller 10 may either:

Choose one of these equal-cost (ECMP) paths by some suitable tie-breaker or randomly and use the direct loading algorithm described above, or Distribute the LSPs evenly (or in proportion to the available capacity) over these multiple paths, then follow the remainder of the direct loading algorithm logic above to program the LSPs onto the network.

In some cases, controller 10 may "split" LSPs to make use of the available capacity. In addition to or alternatively to the direct approach of sequentially programming the LSPs onto the network, multiple paths from the result set of N paths may be used more aggressively to determine the optimal "split" for larger LSPs over multiple potential paths. An LSP may be associated with a flow path for one or more traffic flows through the network. An example algorithm usable by router to loading a set of LSPs, split from a larger LSP, to a set of paths corresponding to outbound link interfaces is as follows and is a generalization of the sequential loading algorithm described above (if it is not possible for a path to carry a LSP, flows of the LSP can be split fairly across the multiple paths rather than depending solely on the ordering of the LSPs in the list):

Push all traffic for each LSP on the first of the paths in the set of N paths.
Store a list of the flow-paths that go through each link interface for corresponding paths.
Find the link interface (worst-link) with the least spare capacity.
If this worst-link has spare capacity >=0.0, then the traffic is all loaded: END.
Else the worst-link has negative spare capacity
Scale all the traffic flows that are on the worst-interface by:

ratio=worst interface→capacity/worst_interface→total_carried_traffic flow_path→failed_traffic=(1−ratio)*flow_path→routed_traffic flow_path→routed_traffic=ratio*flow_path→routed_traffic Remove the failed traffic from the network
Place the failed traffic from these flows back onto the network using the first path in the set of N path that has spare capacity
If no such paths, then put the failed traffic back onto the first path.
Iterate to [Find the link interface with the least spare capacity] until a stopping criteria is reached or all traffic is successfully loaded.
If all traffic is routed, the solution is the distribution of traffic from this LSP flow onto the associated paths In some examples, the above approach to spread the traffic over equal cost paths as described in the section above, or may set a threshold such that only LSPs with bandwidth greater than the threshold are split.

The above approach may distribute the LSPs over multiple paths to avoid congestion points in the network. Instead of merely avoiding congested links, the approach may be modified to instead calculate the mean utilization of all links in the network. Then the LSP loading device may apply the approach and other formulae described above to remove LSPs from the links where utilization >ratio* mean_utilization or utilization >100% rather than simply removing LSPs from links at capacity.

With this changed criterion, the algorithm could be applied as before but as the iteration progresses we gradually increase the threshold for links to take the LSPs off until it reaches 100%.

Figure 12:
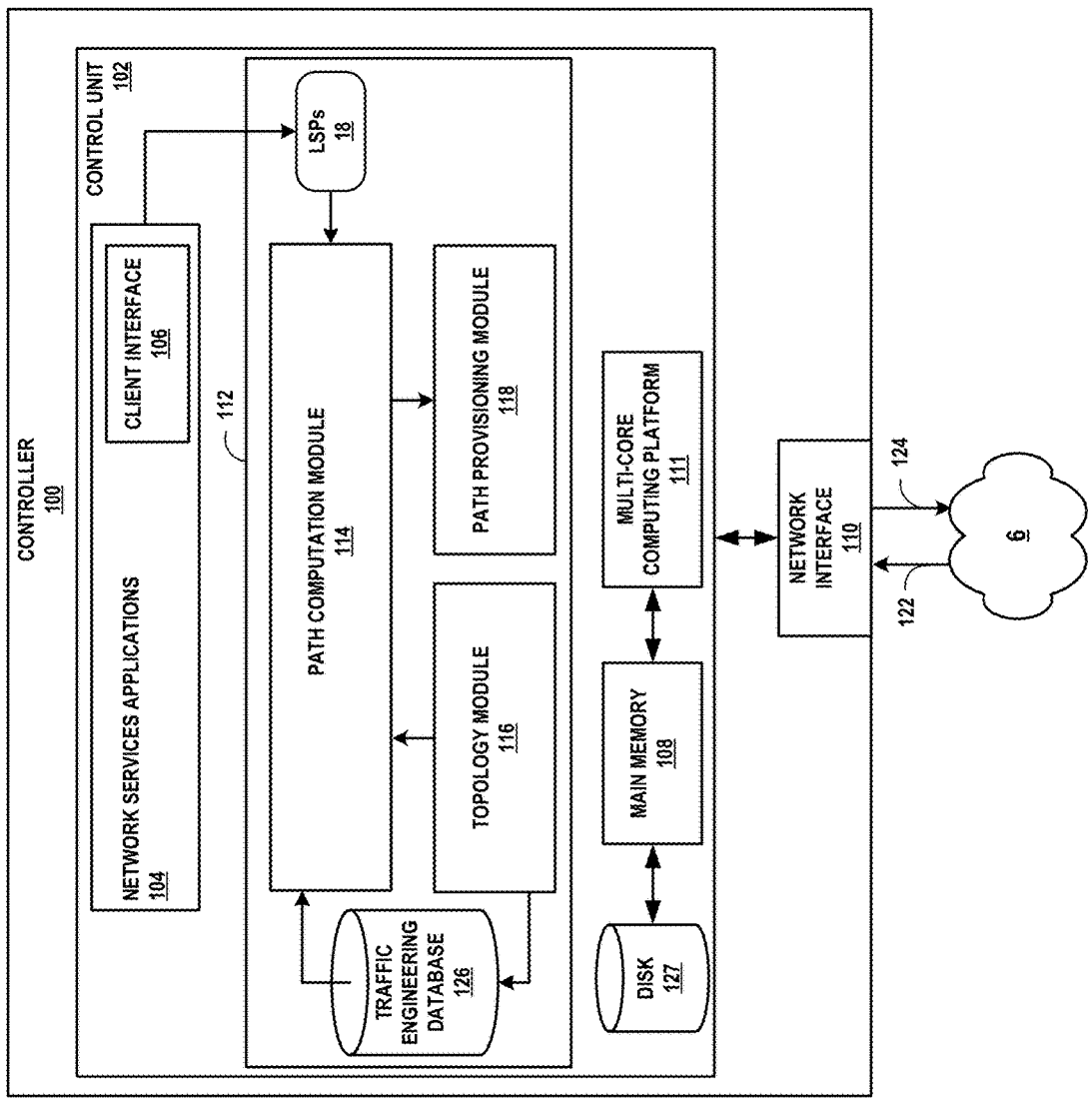
FIG. 12 is a block diagram illustrating an example path computation device configured to compute paths for label switched paths (LSPs) in accordance with techniques of this disclosure.

FIG. 12 is a block diagram illustrating an example path computation device configured to compute paths for label switched paths (LSPs) in accordance with techniques of this disclosure. Controller 100 may receive path requests, computes and schedules paths that satisfy the path requests, and establishes requested paths in a path computation domain according to techniques described herein. Controller 100 may include one or more servers or network controller, for example, and may represent an example instance of controller 10 of FIG. 1. Aspects of controller 100 may be implemented in a set of one or more network routers.

Controller 100 includes a control unit 102 coupled to a network interface 110 to exchange packets with other network devices by one or more inbound links 122 and one or more outbound links 124. Main memory 108 of control unit 102 represents one or more computer-readable storage media, which may include random-access memory (RAM) such as various forms of dynamic RAM (DRAM), e.g., DDR2 SDRAM, or static RAM (SRAM), Flash memory, or any other form of fixed or removable storage medium that can be used to carry or store desired program code and program data in the form of instructions or data structures and that can be accessed by a computer. Main memory 108 provides a physical address space composed of addressable memory locations accessible by modules 112, 104.

Main memory 108 is coupled to disk 127, which may comprise computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store data and instructions.

Control unit 102 in this example includes multi-core computing platform 111 to execute modules 104, 112. Multi-core computing platform includes multiple processing cores that each includes an independent execution unit to perform instructions that conform to an instruction set architecture for the core. Cores of multi-core computing platform 111 may each be implemented as separate integrated circuits (ICs) or may be combined within one or more multi-core processors (or "many-core" processors) that are each implemented using a single IC (i.e., a chip multiprocessor).

Multi-core computing platform 111 executes software instructions, such as those used to define a software or computer program, stored to main memory 108. Alternatively, or additionally, control unit 102 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 102 provides an operating environment for network services applications 104 and path computation element 112. In some example, these modules may be implemented as one or more processes executing on one or more virtual machines of one or more servers. That is, while generally illustrated and described as executing on a single controller 100, aspects of modules 104, 112 may be executed on other computing devices.

Network services applications 104 represent one or more processes that provide services to clients of a service provider network that includes network 6 and controller 100 to manage connectivity in the path computation domain. Network services applications 104 may provide, for instance, include Voice-over-IP (VoIP), Video-on-Demand (VOD), bulk transport, walled/open garden, IP Mobility Subsystem (IMS) and other mobility services, and Internet services to clients of the service provider network. Networks services applications 104 require services provided by path computation element 112, such as node management, session management, and policy enforcement. One or more of network services applications 104 may include or otherwise make use of a client interface 106 by which one or more client applications request services. Client interface 106 may represent a command line interface (CLI) or graphical user interface (GUI), for instance. Client 106 may also, or alternatively, provide an application programming interface (API) such as a web service to client applications.

Network services applications 104 issue path requests to path computation element 112 to request paths in a path computation domain controlled by controller 100. For example, a path request may include a required bandwidth or other constraint and two endpoints representing a source and a destination that communicate over the path computation domain managed by controller 100. Control unit 102 stores path requests as respective LSP definitions in the LSPs 18 data structure. In some cases, the service provider or other administrator of network 6 may configure, via an administrative interface, one or more LSP definitions in LSPs 18.

Path computation element 112 accepts path requests from network services applications 104 to establish paths between the endpoints over the path computation domain. Paths may be requested for different times and dates and with disparate bandwidth requirements. Path computation element 112 reconciles path requests from network services applications 104 to multiplex requested paths onto the network 6 path computation domain based on requested path parameters and network resource availability.

To intelligently compute and establish paths through the path computation domain, path computation element 112 includes topology module 116 to receive traffic engineering information, such as traffic engineering information 21 of FIG. 1, describing available resources of network 6, including routers 4 and interfaces thereof and interconnecting network links. Topology module 116 may execute one or more southbound protocols, such as Open Shortest Path First with Traffic Engineering extensions (OSPF-TE), intermediate System to Intermediate System with Traffic Engineering extensions (ISIS-TE), BGP Link State (BGP-LS), to learn traffic engineering information for network 6.

Traffic engineering database (TED) 126 stores traffic engineering information, received by topology module 116, for network 6 that constitutes a path computation domain for controller 100. TED 126 may include one or more link-state databases (LSDBs), where link and node data is received in routing protocol advertisements, received from a topology server, and/or discovered by link-layer entities such as an overlay controller and then provided to topology module 116. In some instances, the service provider or other administrative entity may configure traffic engineering or other topology information within TED 126 via an administrative interface.

In accordance with techniques described in this disclosure and to satisfy path requests from network services applications and/or administratively-configured paths, path computation module 114 of path computation element 112 executes one or more algorithms described in this disclosure to compute and select from a result set of N paths for and/or program such paths for LSPs 18 in network 6.

Aspects of path computation module 114 may be executed in parallel on different execution units of multi-core computing platform 111. For example, path computation for different node pairs may be an independent operation. Path computation module 114 may therefore spawn different threads executing in parallel on multi-core computing platform 111 to concurrently execute algorithms described herein to compute and select from result set of N paths for multiple node-pairs in parallel. In some examples, path computation module 114 may apply suitable locking constructs, such as mutexes or semaphores, to provide exclusive access to a queue or other data structure that stores a list of path pairs to which the different threads are to perform operations described herein.

Each worker thread looks in the list of path pairs remaining to be processed and takes the first one that is free. The worker thread may then lock the source to prevent another thread from accessing the same memory, process the taken path pair, and once finished processing set a flag on the path pair to indicate that the processing is complete.

In this way, path computation module 114 exploits parallelism algorithms described herein. In instances in which multiple routers 4 cooperatively implement controller 100 (i.e., controller 100 is decentralized among routers 4), one or more of routers 4 may execute as a "thread" to execute algorithms to process the corresponding set of LSPs sourced by the router.

Path computation module 114 attempts to set the paths onto the LSPs 18 (alternatively referred to as "flows") according to the network model defined by TED 126.

Path provisioning module 118 of controller 100 programs the paths for routed LSPs of LSPs 18 into network 6 to cause the state of network 6 to match the state of network 6 as determined by path computation module 114. Path provisioning module 118 may represent an example of path provisioning module 26 of FIG. 1. In general, paths are unidirectional. Provisioning a path may require path validation prior to committing the path to provide for packet transport. Path provisioning module 118 executes one or more southbound protocols for path provisioning to inject state into elements of network 6, such as any one or more of routers 4. For example, southbound protocols may include Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), NETCONF/Yang, Interface to the Routing System (I2RS) protocols, CLIs for the network elements, Simple Network Management Protocol (SNMP), and OpenFlow (or other SDN protocol). Path provisioning module 118 may provide an ERO for routed LSPs 18 to source routers for the routed LSPs, which may then signal the LSPs using RSVP-TE or SPRING, for example.

The following describes additional extensions or modifications to algorithms described above that may improve path selection in some cases.

The problem of finding a globally-optimal" set of N paths from a large number of possible paths scales exponentially with N. Hence it may be impractical to apply a brute-force method to find this best set unless both N and the number of possible paths is small.

The algorithm to determine a locally-optimal set of N paths for the general cost function, described above primarily with respect to FIG. 3, is fast and efficient, but it is not a global optimization algorithm. The set of paths found depends on the order in which the paths are presented to the algorithm for selection. However, while it is not strictly a global optimization algorithm, as long as the approach gives reasonably good results, then the se may be post-processed to find better solutions if these are available.

Unless the network has many equal-cost (or nearly equal-cost) paths, then only a reasonably small subset of these paths are likely to be used in practice. The local optimization algorithm does a well at finding the better few paths in this set, but it may not find the best set of the remainder. This then can be used as a basis for an algorithm to find a better set. To move toward a more global optimum, the algorithm may determine a result set of M paths, where M>N (e.g., M=2/V). Then a selection algorithm, such as mode of operation 1000, may be applied to select the best N paths from the set of M paths. If M is only slightly higher than N, then an exhaustive search approach may be applied to find the best (M−N) paths to remove from this set to minimize the total cost function. Hence, for example if M=N+2, then M*(M−1) paths are searched to find the best two paths to remove from the set to minimize the overall cost function for the result N paths. The computational complexity of this approach grows exponentially the larger the gap between M and N but as long as the gap is small (e.g., <5) then this is still an efficient approach.

Stochastic global-optimal algorithms for selecting N paths from a larger set. If we are determined to find a close approximation to a globally optimal set then a global optimization technique, such as simulated annealing, in combination with the local optimization approach may be used to steer the solution towards a global optimization. An example algorithm to do this is as follows.

Select at random N-paths from the larger set of locally-optimized set of M paths
Iterate in an outer loop over many iterations . . .
Find a path that is not in the current set of N-paths.
Use the algorithm described above for a locally-optimal set to calculate the change to the overall cost function by swapping out this path.
Then apply the simulated annealing technique of . . .
If the new path reduces the overall cost function . . .
Then use this and replace out the worst of the existing paths.
If the new path increases the overall cost function
Then use a random selection with a probability $$P(\text{accept}) = \exp\left(-\frac{\text{Delta\_cost}}{T}\right)$$

Where Delta_cost is the increase in the overall cost by swapping out this path.
And T is an overall temperature parameter to control the probabilities of accepting or rejecting a change that increase the cost.
Slowly reduce the "temperature" parameter so that the probability of accepting a change that increases the total cost reduces as the iteration progresses.

The temperature parameter could be reduced by a fixed formula with the iteration progress or it could be reduced according to some criteria of slowly reducing the number of path changes that increase the cost. Simulated annealing and other global optimization techniques are described further in U.S. Publication Number 2016/0191391 A1, published Jun. 30, 2016, which is incorporated by reference herein in its entirety.

The algorithms described above can be applied to path calculations subject to additional constraints—such as available bandwidth, link coloring and other properties of the links. The above approaches may be generalized to find alternative sets of result N paths that satisfy additional constraints. For example:

If there are LSPs between a pair of nodes that have specific constraints on the links (or other devices) that can be used as a path for this LSP
Prune from the network graph all links (and/or other devices) that don't satisfy these constraints.
And use any or all of the techniques described above to find a result set of N paths between the node pairs that satisfy this constraint.
This set of constrained paths can be saved as a separate set of paths to be used by this specific set of LSPs that are subject to these constraints.
Or, if all the LSPs between the node-pair are subject to the same constraints, only one set is needed.

Equation (2) may be extended or modified to assign a different importance to separateness of the multiple paths. For example, equation (2) may be modified to change the power of the penalty for multiple paths on the same link, node, and/or SLRG from 2 to another number. As another example, weights for $W_{Link}$, $W_{Node}$, or $W_{SRLG}$ may be applied individually to each element rather than by globally weighting all elements of the same type. For example, a specific node (or link, or SRLG) may be on every path between a pair of nodes, in which case it might be sensible to set the weight assigned to this element to zero (or a low number) so that the inevitable overlap on the paths on this element don't distort the overall cost formula. As another example, a specific SLRG might be a very unlikely element to fail (or very likely to fail), which case a lower (or higher) weight may be assigned to the specific SRLG. Alternatively, the weight of a SRLG corresponding to a section of optical fiber may be assigned based on the optical section length.

Accordingly, a more general formula for the above examples is:

$$\text{Total}_{Cost} = W_{Metric} \times \sum_{links} M(\text{Link}) \times P(\text{Link}) + \qquad (7)$$

$$\sum_{links} W_{Link} \times \max\{(P(\text{Link}) - 1), 0\}^X +$$

$$\sum_{Nodes} W_{Node} \times \max\{(P(\text{Node}) - 1), 0\}^Y +$$

$$\sum_{SRLGs} W_{SRLG} \times \max\{(P(SRLG) - 1), 0\}^Z.$$

where . . .

$W_{Metric}$=weight assigned for link metric $W_{Link}$=weight assigned for overlapping paths on a specific link $W_{Node}$=weight assigned for overlapping paths on a specific node $W_{SRLG}$=weight assigned for overlapping paths on an specific SRLG M(Link)=metric on a specific link P(Link)=number of paths on a specific link P(Node)=number of paths passing through a specific node P(SRLG)=number of paths on a specific SRLG X,Y,Z are the respective powers raised to peanalise multiple paths on Links, Nodes and SRLGs respectively Any of the algorithms and techniques described above can be modified to apply equation (7) instead of equation (2).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method comprising:
    obtaining a set of N paths between a pair of nodes of a network topology model for a network of routers interconnected by a plurality of links in a network topology, where N>2;
    for each label switched path from a plurality of label switched paths to be routed to the network topology:
        in response to identifying, from the set of N paths, a path for the label switched path that has capacity for a required bandwidth of the label switched path, deducting the required bandwidth of the label switched path from one or more links of the path of the network topology model to modify the network topology model and outputting data to the network for programming the label switched path in the network on the path; and
        in response to failing to identify a path for the label switched path from the set of N paths, adding the label switched path to a set of failed label switched paths for which paths could not be identified; and
    processing the set of failed label switched paths for which paths could not be identified to program at least one of the set of the failed label switched paths in the network, the set of failed label switched paths including two or more failed label switched paths.

2. The method of claim 1, wherein processing the set of failed label switched paths comprises:
    for each failed label switched path from the set of failed label switched paths:
        computing, for the failed label switched path, a constrained shortest path between the pair of nodes of the network topology model; and
        in response to successfully computing the constrained shortest path, deducting a required bandwidth for the failed label switched path from one or more links of the constrained shortest path to modify the network topology model and outputting data to the network for programming the failed label switched path in the network on the constrained shortest path.

3. The method of claim 2, wherein computing the constrained shortest path comprises computing, for the failed label switched path, the constrained shortest path between the pair of nodes of the modified network topology model only after each label switched path from the set of N paths has been programmed in the network.

4. The method of claim 1,
    wherein the set of N paths comprises an ordered set of N paths, and

39 wherein identifying the path for the label switched path from the set of N paths that has capacity for the required bandwidth of the label switched path comprises:
determining, in an order for the ordered set of N paths, the first path from the set of N paths that has capacity for the required bandwidth of the label switched path.

5. The method of claim 4, further comprising:
obtaining an unordered set of N paths; and
sorting the unordered set of N paths by one of lowest metric, lowest delay, highest capacity, and overall cost to obtain the ordered set of N paths.

6. The method of claim 5, wherein sorting the unordered set of N paths by overall cost to obtain the ordered set of N paths comprises:
identifying a first worst path from the N paths that, if removed from the N paths, produces a remaining N−1 paths that has a lowest total cost according to a cost function, and moving the first worst path to the Nth position in the ordered set of N paths; and
identifying a second worst path from the remaining N−1 paths that, if removed from the N−1 paths, produces a remaining N−2 paths that has a lowest total cost according to the cost function, and moving the second worst path to the (N−1)th position in the ordered set of N paths.

7. The method of claim 5, wherein determining a lowest total cost of a set of paths comprises applying at least one weight to increase respective costs of at least one of one or more links, one or more nodes, and one or more shared risk link groups that have overlapping paths from the remaining paths.

8. The method of claim 1, further comprising:
determining a best diverse pair of paths from the set of N paths by:
computing respective overlaps for each possible pair of paths from the set of N paths;
identifying, based at least on the overlaps, one or more pairs of paths that each has a minimum overlap of the overlaps; and
determining, from the one or more pairs of paths, the best diverse pair of paths having one of the minimum total metric and minimum total delay,
wherein obtaining the set of N paths comprises obtaining the best diverse pair of paths.

9. The method of claim 1, further comprising:
sorting an unordered set of label switched paths by one of ascending order of required bandwidth and descending order of required bandwidth to obtain an ordered set of label switched paths,
wherein attempting to route the plurality of label switched paths comprises attempting to route the plurality of label switched paths in an order of the ordered set of label switched paths.

10. The method of claim 1, further comprising:
attempting to route the plurality of label switched paths by a device comprising one of a controller for the network and a router of the routers.

11. The method of claim 1, attempting to route a first label switched path of the plurality of label switched paths comprises:
splitting, by a router of the routers, packet flows for the first label switched path over two or more paths of the set of N paths.

40

12. The method of claim 11, further comprising:
splitting the packet flows for the label switched path when a link of a first path of the two or more paths has utilization that exceeds one of a factor of a mean link utilization and a capacity of the link.

13. The method of claim 1,
wherein the set of N path comprises a first set of N paths, and
wherein obtaining the first set of N paths comprises:
determining, by the path computation device, a second set of N paths from a set of M paths, where M>N>2;
obtaining, by the path computation device, a test path from the set of M paths and a total metric for the test path, wherein the test path is not in the second set of N paths;
determining, by the path computation device, a worst path from the second set of N paths that has a total metric that is worse than respective total metrics of the other paths from the second set of N paths, wherein the total metric of the worst path is a worst cost of the second set of N paths; and
by the path computation device in response to determining the total metric for the test path is less than the worst cost, removing the worst path from the second set of N paths and adding the test path to the second set of N paths to obtain the first set of N paths.

14. The method of claim 1, further comprising:
wherein the set of N path comprises a first set of N paths, and
wherein obtaining the first set of N paths comprises:
determining, by the path computation device, a second set of N paths from the set of M paths, where M>N>2;
obtaining, by the path computation device, a test path from the set of M paths and a total metric for the test path, wherein the test path is not in the second set of N paths;
determining, by the path computation device, a worst path from the second set of N paths that has an incremental cost that is worse than respective incremental costs of the other paths from the second set of N paths, wherein the incremental cost of the worst path is a worst cost of the second set of N paths;
by the path computation device in response to determining the incremental cost for the test path is less than the worst cost, adding the test path to the second set of N different paths to obtain a set of N+1 paths; and
by the path computation in response to determining a worst cost path of the set of N+1 paths that, if removed from the set of N+1 paths, would most reduce a total cost of the remaining paths from the set of N+1 paths, removing the worst cost path from the set of N+1 paths to obtain the set of N paths.

15. A network device comprising:
one or more processors coupled to a memory,
wherein the one or more processors are configured to obtain a set of N paths between a pair of nodes of a network topology model for a network of routers interconnected by a plurality of links in a network topology, where N>2, and
wherein the one or more processors are configured to, for each label switched path from a plurality of label switched paths to be routed to the network topology:
in response to identifying, from the set of N paths, a path for the label switched path that has capacity for a required bandwidth of the label switched path, deduct the required bandwidth of the label switched path from one or more links of the path of the network topology model to modify the network topology model and output data to the network for programming the label switched path in the network on the path;

in response to failing to identify a path for the label switched path from the set of N paths, add the label switched path to a set of failed label switched paths for which paths could not be identified; and process the set of failed label switched paths for which paths could not be identified to program at least one of the set of the failed label switched paths in the network, the set of failed label switched paths including two or more failed label switched paths.

16. The network device of claim 15, wherein the network device comprises a controller for the network of routers.

17. The network device of claim 15, wherein the network device comprises a router of the network of routers.

18. A non-transitory computer-readable medium comprising instructions for causing one or more processors to:

obtain a set of N paths between a pair of nodes of a network topology model for a network of routers interconnected by a plurality of links in a network topology, where N>2; and for each label switched path from a plurality of label switched paths to be routed to the network topology:

in response to identifying, from the set of N paths, a path for the label switched path that has capacity for a required bandwidth of the label switched path, deduct the required bandwidth of the label switched path from one or more links of the path of the network topology model to modify the network topology model and output data to the network for programming the label switched path in the network on the path;

in response to failing to identify a path for the label switched path from the set of N paths, add the label switched path to a set of failed label switched paths for which paths could not be identified; and process the set of failed label switched paths for which paths could not be identified to program at least one of the set of the failed label switched paths in the network, the set of failed label switched paths including two or more failed label switched paths.

* * * * *